United States Patent
Chua-Eoan et al.

(10) Patent No.: US 7,181,639 B2
(45) Date of Patent: Feb. 20, 2007

(54) METHOD AND APPARATUS FOR CONTROLLING THE FLOW OF DATA BETWEEN TWO CIRCUITS BY GENERATING ONE OR MORE PHASE SHIFTED CLOCK SIGNALS

(75) Inventors: Lew Chua-Eoan, San Jose, CA (US); Atsushi Hasegawa, Sunnyvale, CA (US); Hsuan-Wen Wang, Sunnyvale, CA (US)

(73) Assignee: Renesas Technology Corpoartion, Tokyo (JP)

( * ) Notice: Subject to any disclaimer, the term of this patent is extended or adjusted under 35 U.S.C. 154(b) by 0 days.

(21) Appl. No.: 11/292,844

(22) Filed: Dec. 1, 2005

(65) Prior Publication Data

US 2006/0085662 A1    Apr. 20, 2006

Related U.S. Application Data

(63) Continuation of application No. 10/152,653, filed on May 20, 2002, now Pat. No. 7,003,686.

(51) Int. Cl.
| | |
|---|---|
| G06F 1/04 | (2006.01) |
| G06F 1/06 | (2006.01) |
| G06F 1/08 | (2006.01) |
| G06F 1/10 | (2006.01) |
| G06F 1/12 | (2006.01) |

(52) U.S. Cl. .................. 713/600; 713/400; 713/401; 713/500; 713/503; 365/233

(58) Field of Classification Search .................. None
See application file for complete search history.

(56) References Cited

U.S. PATENT DOCUMENTS

| | | | | | |
|---|---|---|---|---|---|
| 6,003,118 | A | * | 12/1999 | Chen ........................... | 713/401 |
| 6,469,555 | B1 | * | 10/2002 | Lau et al. .................... | 327/158 |
| 6,552,958 | B2 | * | 4/2003 | Shikata et al. .............. | 365/233 |
| 6,798,257 | B1 | * | 9/2004 | Roe ............................ | 327/147 |
| 6,839,860 | B2 | * | 1/2005 | Lin ............................. | 713/401 |
| 2003/0014681 | A1 | * | 1/2003 | McBride et al. ............ | 713/401 |

* cited by examiner

Primary Examiner—James K. Trujillo
(74) Attorney, Agent, or Firm—Townsend and Townsend and Crew LLP

(57) ABSTRACT

An interface circuit according to one embodiment of the present invention includes a clock signal, a first phase locked loop coupled to the clock signal line and generating a reference clock signal, a second phase locked loop receiving the reference clock signal, and in accordance therewith, generating one or more phase shifted reference clock signals, and a data transceiver circuit coupled to receive at least one of the clock signal, the reference clock signal, or one or more of the phase shifted reference clock signals to control the flow of data between a first circuit and a second circuit. An interface circuit according to one embodiment of the invention can be used advantageously for controlling the flow of data between a CPU and an external memory.

10 Claims, 19 Drawing Sheets

METHOD AND APPARATUS FOR CONTROLLING THE FLOW OF DATA BETWEEN TWO CIRCUITS BY GENERATING ONE OR MORE PHASE SHIFTED CLOCK SIGNALS

CROSS REFERENCE TO RELATED APPLICATIONS

This application is a continuation application of U.S. application Ser. No. 10/152,653 filed on May 20, 2002 now U.S. Pat. No. 7,003,686 which is incorporated herein by reference.

BACKGROUND

The present invention relates to interface circuits, and more particularly, to interface circuits utilizing phase locked loops to control the flow of data between electronic systems.

The ever increasing demand for information has resulted in an ever increasing demand on electronic circuits and systems to increase information processing abilities. One factor that can be critical to information processing speeds is the rate at which information is transferred between different elements of a system. FIG. 1 illustrates two electronic system elements 100 and 120, which are coupled together by a data communication bus 110. Each system element 100 and 120 may perform particular, and possibly unique, functions executed by cores 101 and 121, respectively. Many electronic system elements may require interaction with one or more other system elements to perform their functions. Interfaces 102 and 122 may be included to perform such interactions over communication bus 110. However, as the information processing speeds of the cores are increased, the speed of the interfaces must also increase to support the increased demands of the cores. Accordingly, improved interface circuit techniques are desirable.

One example of an information processing system in which information is transferred between different system elements is a computer system. Two factors central to increasing information processing capabilities in a computer system are the ability to quickly execute specific instructions, for example, in a central processing unit ("CPU"), and the ability to store large amounts of data that may be processed by the CPU. The last two decades have seen explosive growths in both the processing power of central processing units and the storage capacity of data storage elements such as hard disk drives and random access memories ("RAM").

Unfortunately, breakthroughs in these areas have also created challenging problems for electronic circuit and system designers. Namely, increased processing power and storage capacity has led to bottlenecks in transferring data between processors and memories. This problem is illustrated in FIG. 2, which shows processor 200 coupled to memory units 221–224 over a bus 220. Processor 200 may be an integrated circuit processor including a CPU core 210, a memory interface 230, and a plurality of subsystem units 241–245. Contemporary CPU cores typically run at very high frequencies, thereby executing large numbers of instructions every second. Instructions and data may be stored external to the processor 200, and thus, a large amount of information may be transferred to and/or from the memories 221–224 over bus 220 every second. Accordingly, as processors obtain ever increasing speeds, and as memories store ever increasing amounts of information utilized by the processors, there is an ever increasing demand placed on the memory interface 230 and bus 220 to meet the speed requirements.

Accordingly, it is desirable to have interface circuits that can transfer data at very high speeds, and in particular, it is desirable to have an interface circuit that can transfer data between a memory and processor at very high speeds.

SUMMARY

An interface circuit according to one embodiment of the present invention includes a clock signal, a first phase locked loop coupled to the clock signal line and generating a reference clock signal, a second phase locked loop receiving the reference clock signal, and in accordance therewith, generating one or more phase shifted reference clock signals, and a data transceiver circuit coupled to receive at least one of the clock signal, the reference clock signal, or one or more of the phase shifted reference clock signals to control the flow of data between a first circuit and a second circuit.

In one embodiment the first phase locked loop includes a feedback loop and at least one reference delay element in the feedback loop, and the data transceiver circuit includes a corresponding delay element, wherein time delays of the delay element and reference delay element are approximately equal.

In one embodiment, an interface circuit according to the present invention is used to control the flow of data between a CPU and an external memory. In one embodiment the external memory is an SDR DRAM. In another embodiment the external memory is a DDR DRAM.

In one embodiment the present invention provides a method of controlling the flow of data between a first circuit and a second circuit, the method comprising generating a first reference clock signal from an input clock signal using a first phase locked loop, generating one or more phase shifted reference clock signals from the first reference clock signal using a second phase locked loop, and receiving one or more of the phase shifted reference clock signals in a data transceiver circuit for controlling the flow of data between said first and second circuits.

The following detailed description and the accompanying drawings provide a better understanding of the nature and advantages of the present invention.

DETAILED DESCRIPTION

Features of the present invention include using a plurality of phase locked loops ("PLLs") in an interface circuit to generate signals for controlling the flow of data between systems. In one embodiment, a reference loop may include reference delay elements corresponding to delay elements in a data transceiver to reduce timing errors between different signals in the system. As used herein, a phase locked loop refers generally to devices that compare the phase and/or frequency characteristics of an input signal and an output signal using a feedback loop, and continuously adjust the loop characteristics so that the output signal is matched in phase with the input signal. One PLL architecture that is particularly advantageous to embodiments of the present invention is a delay locked loop, which is discussed in more detail below.

Figure 1:
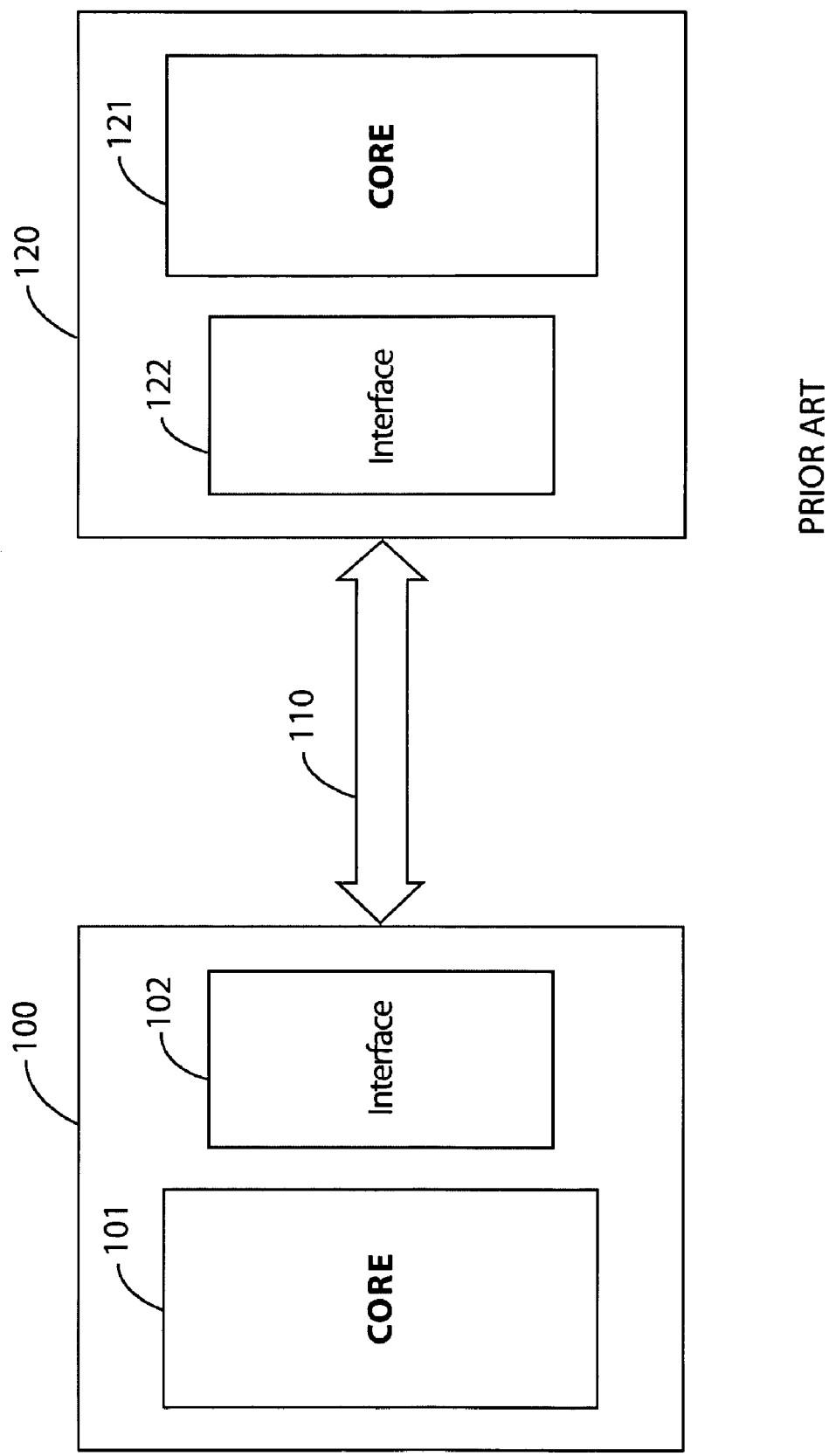
FIG. 1 illustrates two electronic system elements including interface circuits for transferring data across a data communication bus.
Figure 2:
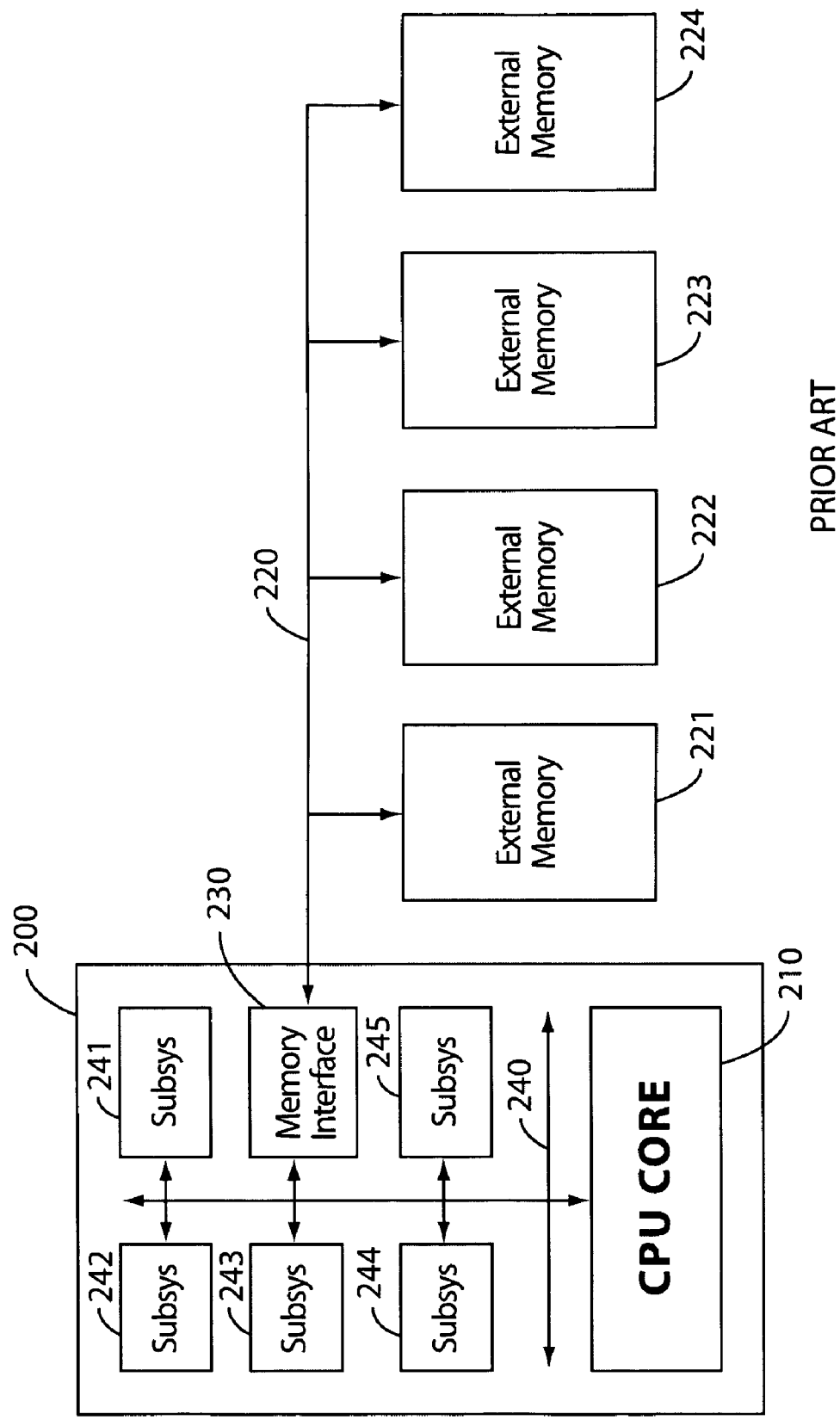
FIG. 2 shows a processor, including a CPU core and memory interface, coupled to memory units over a bus.
Figure 3:
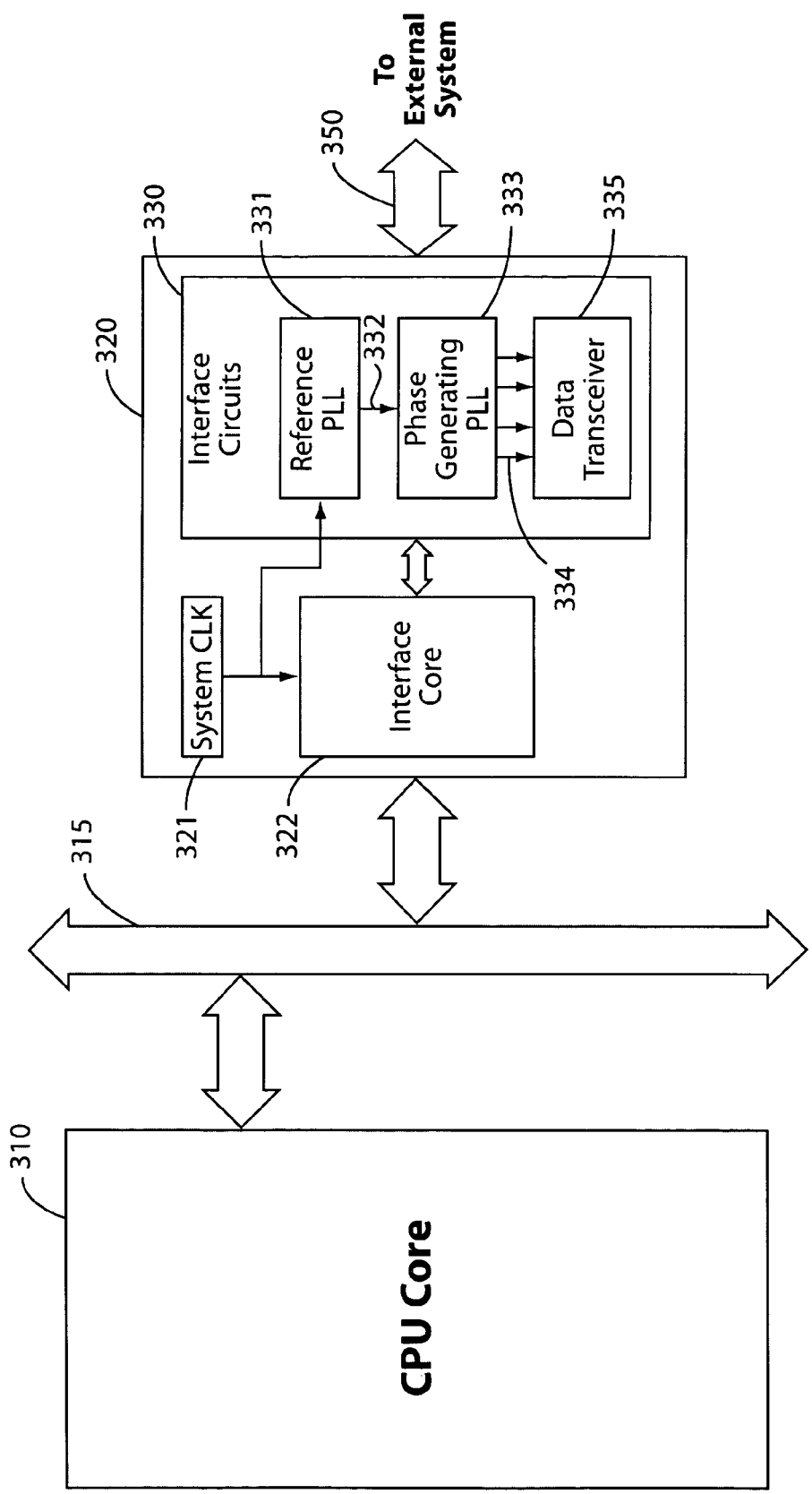
FIG. 3 illustrates an interface circuit including a reference PLL and a phase generating PLL for controlling a data transceiver according to one embodiment of the present invention.

FIG. 3 illustrates an interface circuit including a reference PLL and a phase generating PLL for controlling a data transceiver according to one embodiment of the present invention. A CPU core 310 is coupled to an interface system 320 by a bus 315. Interface system 320 includes a system clock signal 321, an interface core 322, and interface circuit 330. Interface core 322 may include logic for interfacing with bus 315 and other logic or digital subsystems necessary for interoperating with external systems over bus 350. The system clock signal 321 may be used to synchronize logic operations on interface system 320, and may be generated internally or externally. Interface circuit 330 includes a reference PLL 331, a phase generating PLL 333, and a data transceiver 335 (i.e., data receiver/transmitter). Reference PLL 331 receives system clock signal 321 as an input and generates a reference clock signal 332. Phase generating PLL 333 receives reference clock signal 332 as an input and generates a plurality of phase shifted reference clock signals 334. The various phases of reference clock signal 332 are coupled to data transceiver 335 for controlling the flow of data between the interface core and external systems. PLL 331 may also include reference delay elements in the loop corresponding to delay elements in the data transceiver so that the reference clock signal can accurately control the receipt and transmission of data in the data transceiver.

Figure 4:
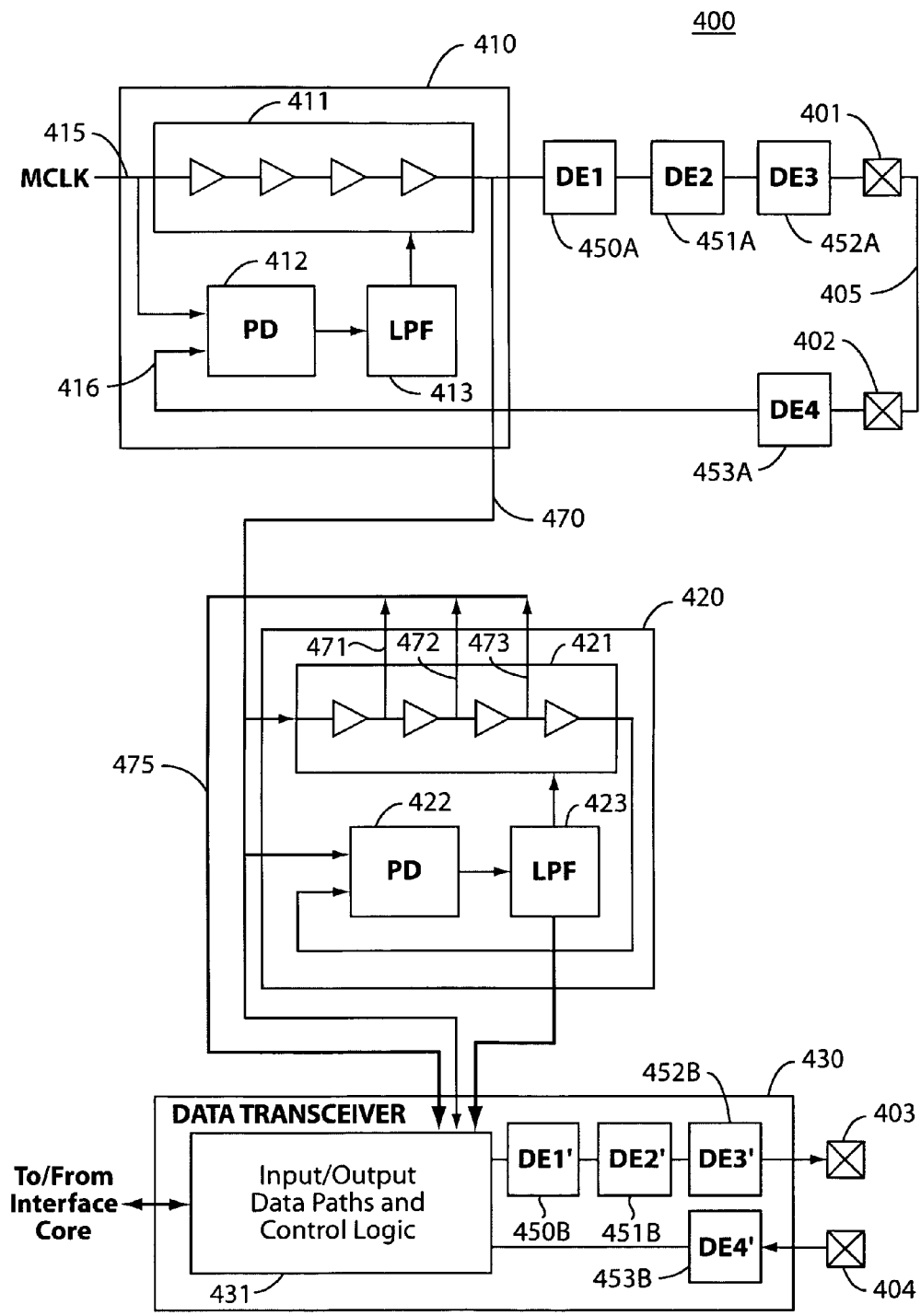
FIG. 4 illustrates an interface circuit including a reference loop, phase generating loop, and data transceiver according to one embodiment of the present invention.

FIG. 4 illustrates an interface circuit 400 including a reference loop, phase generating loop, and data transceiver according to one embodiment of the present invention. The PLL architectures utilized in interface circuit 400 are delay locked loops ("DLLs"). Reference DLL 410 receives a master clock signal MCLK on DLL input node 415. The clock signal is delayed in a controlled delay line 411 to generate a reference clock signal on signal line 470. The reference signal may then be passed through output reference delay elements DE1–DE3 450A–452A and may be received at an output pin 401. An external signal carrying trace 405 couples the signal to a second pin 402, and through reference delay element DE4-453A. Phase lock in DLL 410 is achieved by providing MCLK and the output of delay element 453A to the inputs of a phase detector 412. The output of phase detector 412 is then passed as an input to a low pass filter ("LPF") 413. The output of LPF 413 is used to control the delay in controlled delay line 411. Because of the loop dynamics, the output of reference delay element 453A on line 416 will be in phase with MCLK. The phase of the reference clock signal on line 470 is related to MCLK by the time delays of reference delay element 453A, the delay of trace 405, and the delays caused by reference delay elements 452A, 451A, and 450A. Accordingly, the reference clock signal is sometimes referred to as "early MCLK" ("EMCLK").

Phase generating DLL 420 receives EMCLK at the input of controlled delay line 421. Phase generating DLL 420 also includes a phase detector 422 and low pass filter ("LPF") 423. Controlled delay line 421 generates phase shifted reference clock signals on signal lines 471–473. While three signals are shown corresponding to three different phases of EMCLK, it is to be understood that fewer or more signals could be used according to different embodiments. The output of delay line 421 is compared with EMCLK at the input of phase detector 422. The output of phase detector 422 is passed to the input of LPF 423, and the output of LPF 423 controls the total time delay between the input and output of delay line 421 to achieve phase lock. EMCLK and the outputs of controlled delay line 421 may then be passed to the inputs of data transceiver 430.

Signal line 470, carrying EMCLK, and the phase shifted reference clock signals on signal lines 471–473, collectively illustrated as line 475, are then provided as inputs to data transceiver 430. Data transceiver 430 is coupled between the interface core and nodes 403 and 404 (e.g. package pins) for receiving and transmitting data between systems. A data transceiver 430 according to embodiments of the present invention may include input data paths or output data paths, or both, including control logic for controlling the flow of data into and/or out of the system, respectively. The input or output data paths may each include elements having inherent delays that can cause deleterious timing effects. For example, an output path may be coupled to pin 403, and may include delay elements DE1' 450B, DE2' 451B, and DE3' 452B, which may each cause time delays to the output signal. Furthermore, the input path may be coupled to pin 404, and may include delay element DE4' 453B, which may cause a time delay to the input signal. Of course, in some embodiments pins 403 and 404 may also be a single bi-directional input-output pin. Some embodiments of the present invention account for such delays by incorporating reference delay elements DE1–DE4 450A–453A corresponding to delay elements DE1'–DE3' 450B–453B, respectively, in the reference loop. The reference delay elements have associated time delays that are approximately equal to the time delays caused by the corresponding delay elements in the input/output paths. Accordingly, timing errors introduced by input and output path delay elements may be compensated for by utilizing signals from reference loop 410 to control data flow in data transceiver 430.

Figure 5A:
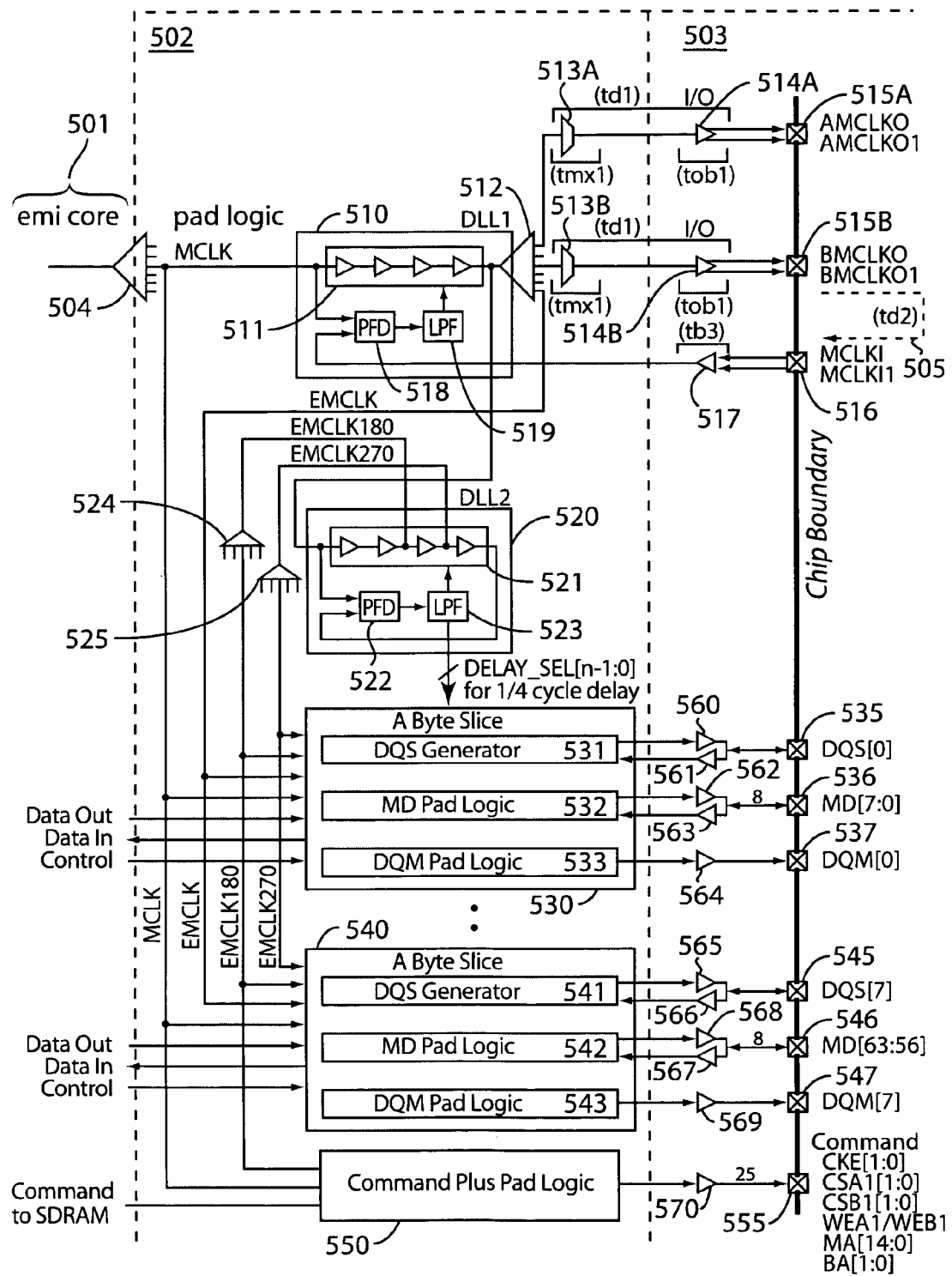
FIG. 5A illustrates a memory interface according to one embodiment of the present invention.

Embodiments of the present invention can be particularly advantageous in interface systems used to control the flow of data between a CPU and a memory. FIG. 5A illustrates a memory interface 500 according to one embodiment of the present invention. Memory interface 500 may be used to regulate the flow of data between an external memory interface ("EMI") core 501 and an external memory (not shown) utilizing interface circuits (e.g. pad logic) 502 and input/output ("I/O") buffers 503. Memory interface 500 includes a reference DLL 510 and a phase generating DLL 520 for generating reference clock signals for controlling the flow of data between an external memory and the EMI core. The system also includes a plurality of data transceivers that receive and transmit data, and a command logic module 550 for transmitting commands to the external memory. The number of data transceivers may correspond to the number of bytes of data that can be transferred in parallel. Two data transceivers 530 and 540 are shown for illustrative purposes.

Each data transceiver includes a data strobe generator "DQS generator" (e.g., 531 and 541), input and output data paths labeled "MD pad logic" (e.g., 532 and 542), and byte enable circuits labeled "DQM pad logic" (e.g., 533 and 543). The DQS generator 531 is coupled to a DQS pin 535 through an output buffer 560 and input buffer 561. Additionally, MD pad logic 532 is coupled to MD pins 536 (e.g., 8 pins for an 8 bit byte) though an output buffer 562 and input buffer 563. Furthermore, DQM pad logic 533 is coupled to DQM pin 537 through an output buffer 564. Each data transceiver in the present embodiment may include similar structure for communicating bytes of data to and from external memory. Thus, DQS generator 541 is coupled to a DQS pin 545 through an output buffer 565 and input buffer 566. Additionally, the MD pad logic 542 is coupled to a MD pin 546 through an output buffer 568 and input buffer 567. Furthermore, the DQM pad logic 543 is coupled to a DQM pin 547 through an output buffer 569.

Similarly, command logic module 550 is coupled to a plurality of control pins, which are collectively represented as pin 555, through a plurality of output buffers represent by buffer 570. For example, external memory may be an SDRAM and control pins may include such signals as clock enable ("CKE"), chip select ("CSA#" and "CSB#") for selecting a particular external memory chip from a plurality of chips, write enable ("WEA" and "WEB"), and address signals ("MA" and "BA") for rows, columns, and banks in external memory.

Reference DLL 510 includes a controlled delay line 511, phase detector 518, and low pass filter 519. Reference DLL 510 also includes reference delay elements in the loop. In the embodiment illustrated in FIG. 5, the reference delay elements are multiplexer 513B contributing a delay of tmx1, output buffer 514B contributing a delay of tbo1, signal trace 505 contributing a delay of td2, and input buffer 517 contributing a delay of td3. The delay of multiplexer 513B and output buffer 514B are represented collectively as td1. In one embodiment, multiplexers may be used that have one input connected to ground, a second input connected to a supply, and a control input connected to the clock signal. While this configuration may be advantageous in many applications, it is to be understood that this configuration is not required.

As described in more detail below, some embodiments may include two signals paths for generating two output clocks. Accordingly, a second multiplexer 513A and second output buffer 514A may also be coupled to the output of DLL 510. If matched multiplexers are used for 513A and 513B, and matched buffers are used for 514A and 514B, then the delay of multiplexer 513B and output buffer 514B may be very close to td1. Accordingly, synchronized output clocks AMCLKO and BMCLKO can be generated at nodes 515A and 515B, respectively. AMCLKO and BMCLKO may also have differential counterparts AMCLKO# and BMCLKO# in embodiments using differential clock.

The output of controlled delay line 511 is also coupled to the input of phase generating DLL 520. Phase generating DLL 520 also includes a controlled delay line 521, phase detector 522, and low pass filter 523 for establishing phase lock. In one embodiment, controlled delay line 521 generates reference clock signals that are 180 degrees ("EMCLK180") and 270 degrees ("EMCLK270") out of phase from the input. It is to be understood that in other embodiments, other phases may be generated.

Figure 5B:
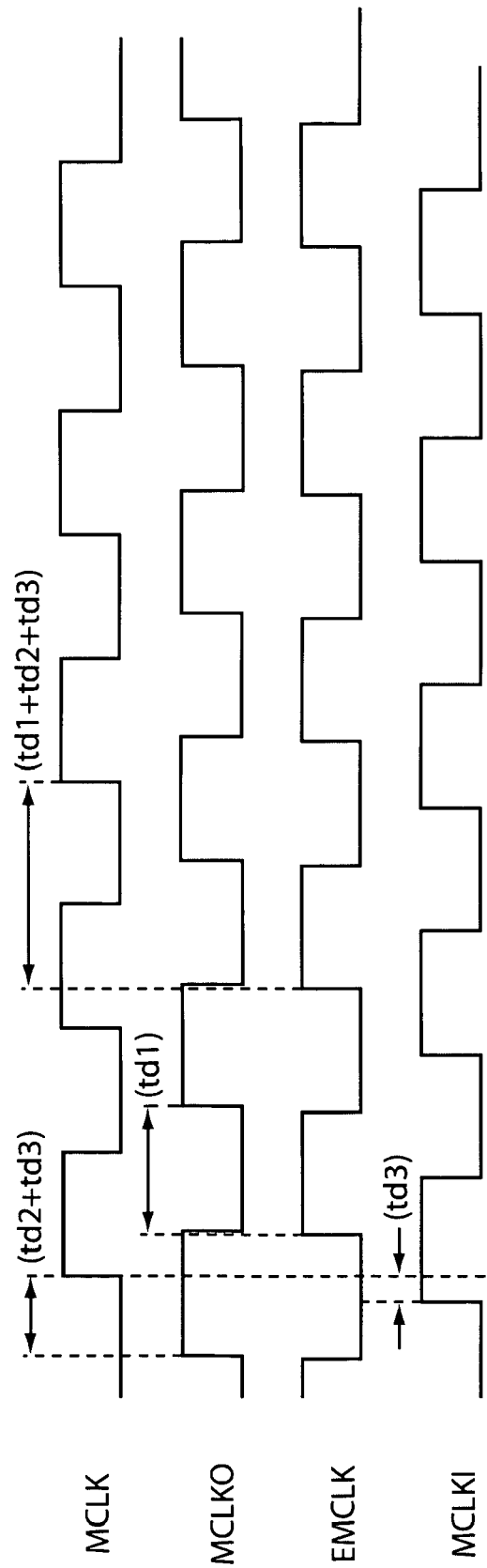
FIG. 5B illustrates clocks signals generated by a reference DLL and phase generating DLL according to one embodiment of the present invention.

A master clock, MCLK, is received from EMI core 501 at the output of clock tree 504. A clock tree is a distribution system including conductor lines for supplying clock signals to other parts of the system. Reference DLL 510 receives MCLK and generates EMCLK at the output of controlled delay line 511 and clock tree 512. The phase shifted reference clock signals EMCLK180 and EMCLK270 are generated by the phase generating DLL 520 and are also passed through clock trees 524 and 525. Therefore, EMCLK, EMCLK180, and EMCLK270 are subjected to substantially equal delays in clock trees 512, 524, and 525, respectively. MCLK, EMCLK, EMCLK180, and EMCLK270 are then passed as inputs to each data transceiver to control the flow of data between the EMI core and nodes 535, 536, 537, 545, 546, and 547. The clocks signals generated by the reference DLL and phase generating DLL as well as the timing relationships according to one embodiment of the present invention are illustrated in FIG. 5B.

Figure 6:
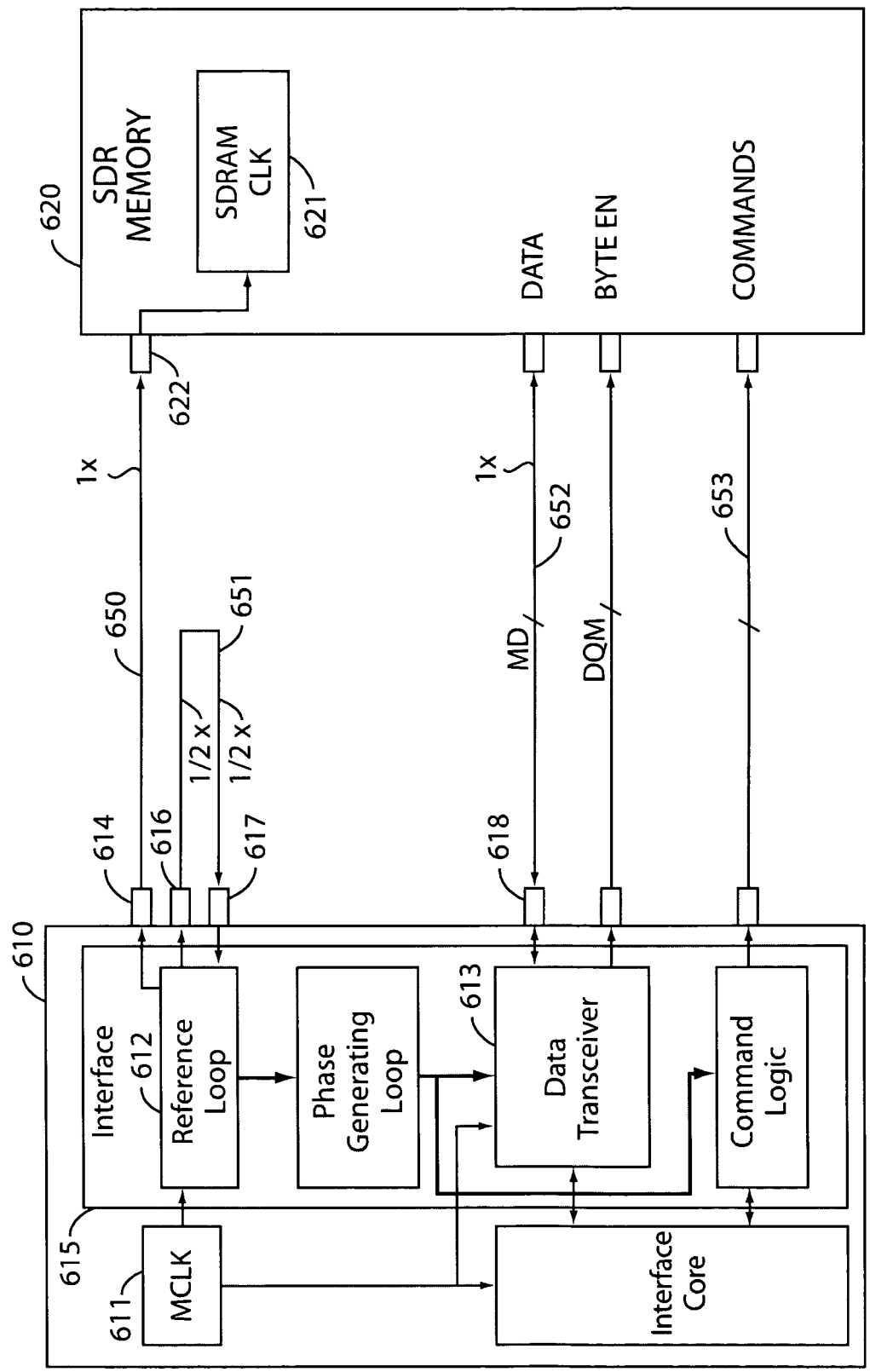
FIG. 6 illustrates an interface circuit configured to communicate with an SDR SDRAM according to one embodiment of the present invention.

Embodiments of the present invention include interface circuits that may be used to communicate with an SDRAM that operates in single data rate ("SDR") mode, double data rate ("DDR") mode, or both. FIG. 6 illustrates an interface circuit configured to communicate with an SDR SDRAM according to one embodiment of the present invention. SDR SDRAM 620 receives a clock signal from the memory interface 610 for controlling the timing of data transactions. Accordingly, data read and write operations carried out between an external memory and an interface must be timed in accordance with the clock transmitted to the SDRAM. Clock signal MCLK may be provided to a reference loop 612 and a data transceiver 613. Reference loop 612 includes an output at pin 614 for providing a clock signal to memory 620 on signal trace 650. Reference loop 612 also includes an output at pin 614 for providing a reference delay on trace 651. According to one embodiment, trace 651 from interface 615 to the external memory 620 is returned to reference loop feedback pin 617 on trace 651 so that the time delay caused by the trace is included in the loop. If the length of trace 650 and data line trace 652 have a length of "1×," then reference delay trace 651 may be designed to have a length "½×." Because the timing relationship between the clock received in SDRAM CLK 621 and data transactions on data line MD 652 are specified, data transfers between memory 620 and interface pin 618 can be aligned for accurate reception by controlling the relation between MCLK and SDRAM CLK using the reference loop.

Figure 7A:
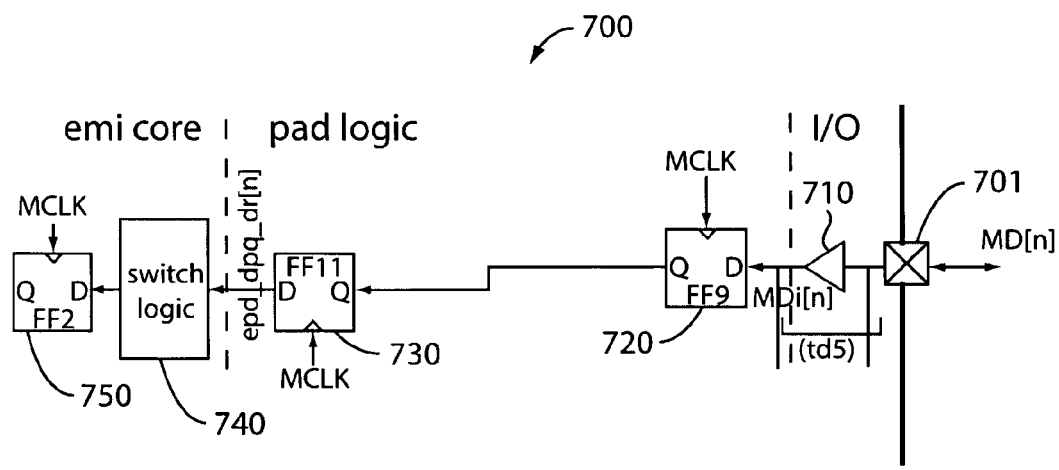
FIG. 7A illustrates an SDR input circuit that may be included in a data transceiver according to one embodiment of the present invention.

FIG. 7A illustrates an input circuit 700 that may be included in an SDR data transceiver according to one embodiment of the present invention. Input circuit 700 includes an input buffer 710, flip-flop 720, and flip-flop 730. Input buffer 710 is coupled to an input pin 701 for receiving data on lines MD[n] from an external SDRAM memory (not shown). The output of input buffer 710 is coupled to the D-input of flip-flop 720. Flip-flop 720 has a clock input coupled to MCLK, which is also the input to the reference PLL. The output of flip-flop 720 is coupled to the input of flip-flop 730, which is also clocked by MCLK. The output of flip-flop 730 is coupled to an interface core ("EMI core") through switch logic 740 and flip-flop 750.

Operation of the present invention can be more readily understood by referring to FIGS. 5A, 6, and 7A. Clock signal MCLK is used to clock data received by input circuit 700. Furthermore, clock signal MCLK is used to generate a reference clock for the SDRAM. Data transmitted from the SDRAM to the interface will be delayed by the signal line 652. However, data transmissions from the SDRAM DATA output are, by design, synchronized to the clock signal received at pin 622 from the interface. Synchronized, as used here in the context of clocking data, means that the rising edge of the clock signal (e.g., at pin 622) is substantially toward the center of a valid data time window (e.g., in the center of the data window for DB0 on line MD or MDi as in FIG. 7B). In general, clocks and data may be synchronized if the triggering edge of the clock is after the data setup time and sufficiently before the end of the data window to allow for the hold time.

The delay effects of the signal line 652 and input buffer 710 on the data can be eliminated, and synchronization achieved at the interface inputs, by included corresponding reference delay elements in the PLL loop used to generate the signal at pin 622. In particular, a reference trace 651 (FIG. 6) and reference input buffer 517 (FIG. 5) may be included that are designed to have time delays corresponding to trace 652 (FIG. 6) and input buffer 710 (FIG. 7). Accordingly, starting at the phase detector input and working backward around the loop in FIG. 5A, it can be seen that there is a time delay between MCLK and the clock signal received at pin 622 (FIG. 6) equal to the time delay of input buffer 517 and trace 651. Since data transmitted from the SDRAM is synchronized to the signal at pin 622, then the data received at flip-flop 720 will be synchronized to MCLK because the data will now be delayed by trace 652 (FIG. 6) and input buffer 710 (FIG. 7), which have delays corresponding to the delays introduced between MCLK and the clock signal at pin 622 by the reference loop.

Figure 7B:
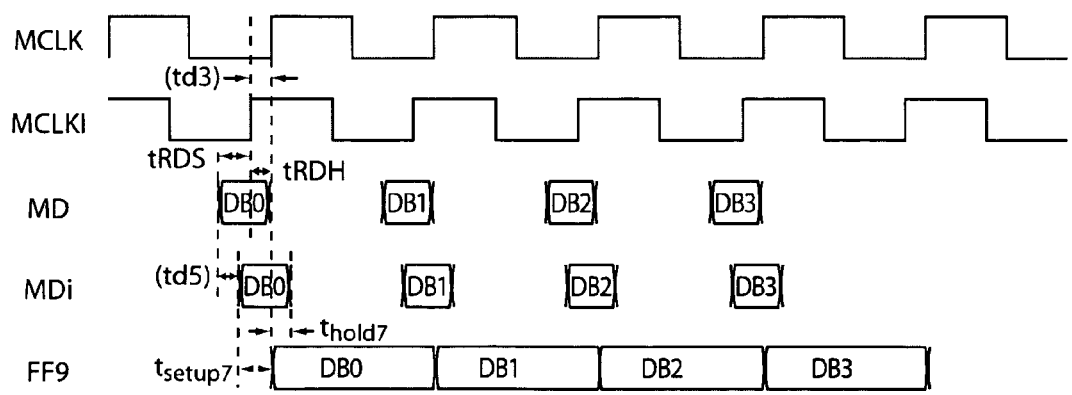
FIG. 7B illustrates a timing diagram for the circuit of FIG. 7A.

FIG. 7B illustrates a timing diagram for the circuit of FIG. 7A. MCLKI is the clock signal at input pin 516 in the reference loop (also pin 617 in FIG. 6). There is a time delay between MCLK and MCLKI equal to the delay of reference input buffer 517. Data MD, received on pin 701, will be synchronized with MCLKI because both MCLKI and the data have been delayed by traces 651 and 652, respectively. Moreover, data MDi and MCLK, both received at flip-flop 720, will be synchronized because both MCLK and MDi are related to the input signals MCLKI and MD by the delay of input buffers 517 and 710, respectively. In particular, MCLK is a delayed version of MCLKI by an amount td3, and MDi is a delayed version of MD by an amount td5. In one embodiment, exemplary values for td3, from reference input buffer 517, and td5, from input buffer 710, may be in the range of 0.225–0.9 ns, with a maximum difference (i.e., absolute value of td3–td5) between td3 and td5 of 100 ps.

Figure 8A:
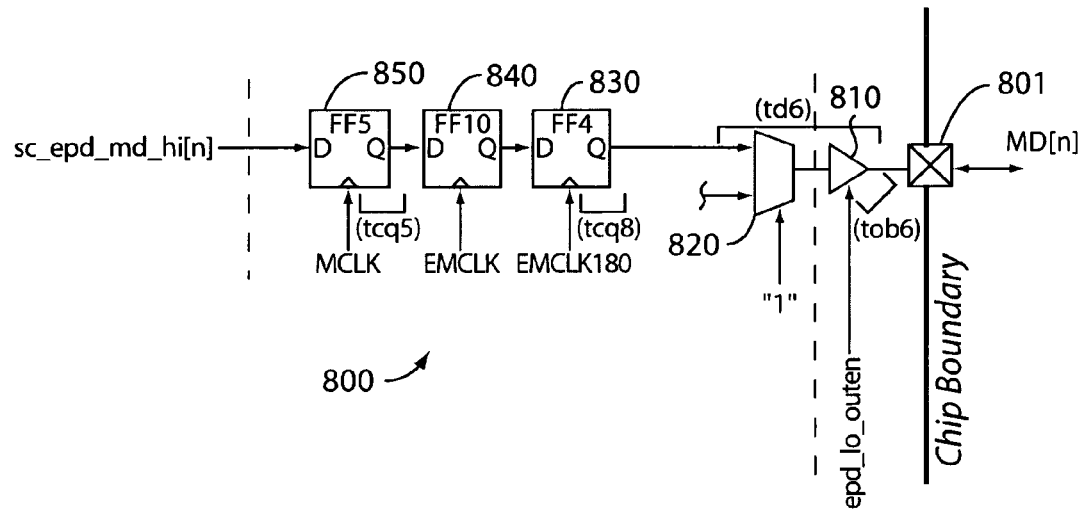
FIG. 8A illustrates an SDR output circuit that may be included in a data transceiver according to one embodiment of the present invention.

FIG. 8A illustrates an output circuit 800 that may be included in an SDR data transceiver according to one embodiment of the present invention. Output circuit 800 includes an output buffer 810, output multiplexer ("MUX") 820, and flip-flops 830–850. Output buffer 810 is coupled to output pin 801 for transmitting data on lines MD[n] to an external SDRAM memory (not shown). Output buffer 810 may also include an enable input for receiving an enable signal "epd_io_outen." The input of output buffer 810 is coupled to the output of MUX 820. MUX 820 has at least one input coupled to receive data from flip-flop 830. In one embodiment, the "1" input of MUX 820 is coupled to the output of flip-flop 830, and a logic high signal (e.g., "1") is coupled to the MUX select input for coupling the output of flip-flop 830 to the input of output buffer 810. Data is received at the input of flip-flop 850 on line "sc_edp_md_hi [n]." Flip-flop 850 loads data from the interface core under control of clock signal MCLK. The output data is successively transferred from flip-flop 850 to flip-flops 840 and 830 under control of EMCLK and EMCLK180, respectively.

Figure 8B:
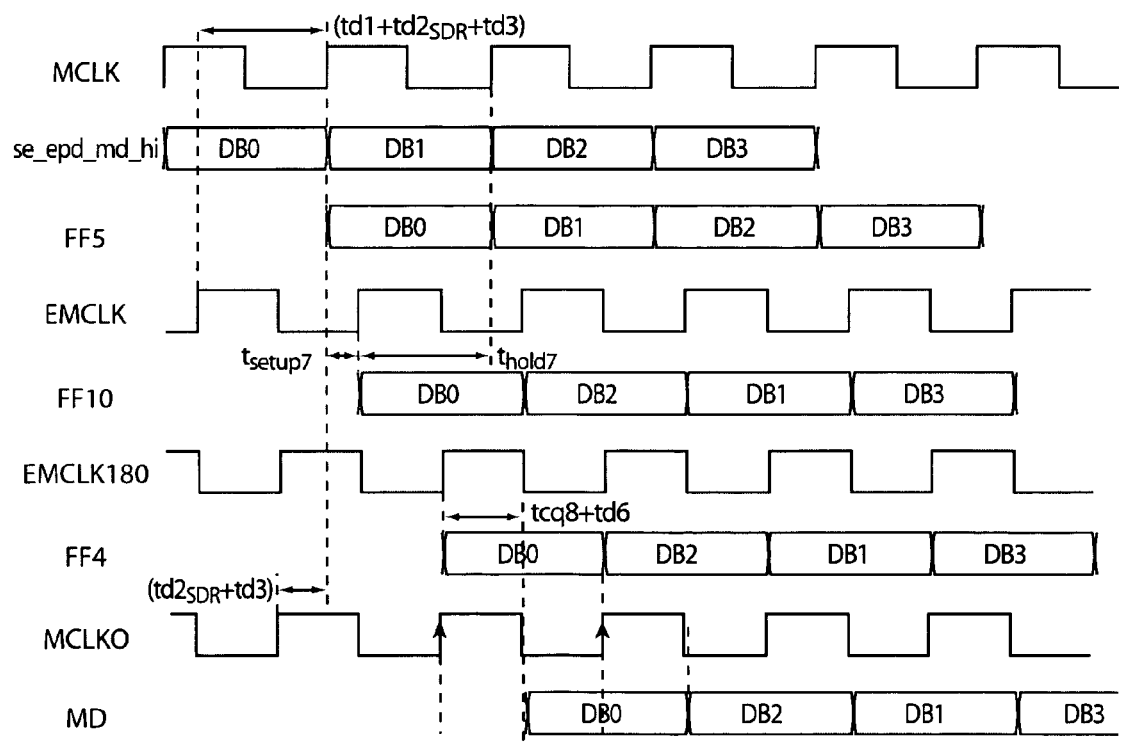
FIG. 8B illustrates a timing diagram for the circuit of FIG. 8A.

Operation of the output circuit 800 can be more readily understood by referring to FIG. 8B, which illustrates a timing diagram for the circuit of FIG. 8A. Data received from the interface core is synchronized with MCLK. Synchronized, as used here, means that successive data bits are passed between the interface core and the data transceiver on the rising edge of MCLK. Accordingly, a new data value is available at each successive rising edge of MCLK. Referring to FIG. 8B, data is loaded into flip-flop 850 ("FF5") on the rising edge of MCLK. Data is then loaded into flip-flop 840 ("FF10") on the rising edge of EMCLK. Similarly, data in FF10 is loaded into flip-flop 830 ("FF4") on the rising edge of EMCLK180. Accordingly, the data is shifted with respect to MCLK by utilizing EMCLK and EMCLK180 to successively load the data into FF10 and FF4, respectively, and the output of FF4 is synchronized to EMCLK180.

As discussed above, in SDR mode the clock signal MCLK is used to generate a reference clock for the SDRAM. SDRAM CLK 621 (FIG. 6) is then used to clock the data received by the SDRAM on signal line 652. Accordingly, both the data from data output circuit 800 and the clock from the reference loop will be delayed as each signal propagates from the interface to the SDRAM. However, the effects of these delays are compensated for by utilizing the reference clocks from the reference PLL and phase generating PLL to control the flow of data.

Data transmitted from FF4 will be delayed by MUX 820, output buffer 810, and signal line 652. Therefore, at output pin MD 801, the data will be delayed from EMCLK180 by tcq8 (i.e., clock to Q time of FF4) and td6 (i.e., the delay of MUX 820 and output buffer 810). Additionally, at the reference loop clock output pin 515 (FIG. 5), clock MCLKO will be delayed from EMCLK by td1 (i.e., the delay of MUX 513 and output buffer 514). Moreover, at the input to the SDRAM, clock MCLKO and the data will be further delayed by and signal lines 650 and 652, respectively. Therefore, because the data at the output of FF4 is aligned with EMCLK180, and because the data and EMCLK are delayed by corresponding delay elements, the data will be received at the SDRAM synchronously with the falling edge of EMCLK. In this manner the rising edge of the SDRAM clock is positioned substantially in the center of the data window to allow accurate sampling of the data into the SDRAM. In one embodiment, exemplary delays may include tcq8(max)=300 ps, td6 between 0.9 and 3.6 ns, td1 between 0.9 and 3.6 ns, and the maximum difference between td6 and td1 may be 400 ps. Additionally, td2 in SDR mode, which is the round trip delay of signal line 505 (i.e., lines 650 and 651 in FIG. 6), may be between 0.375 to 1.5 ns.

Figure 9:
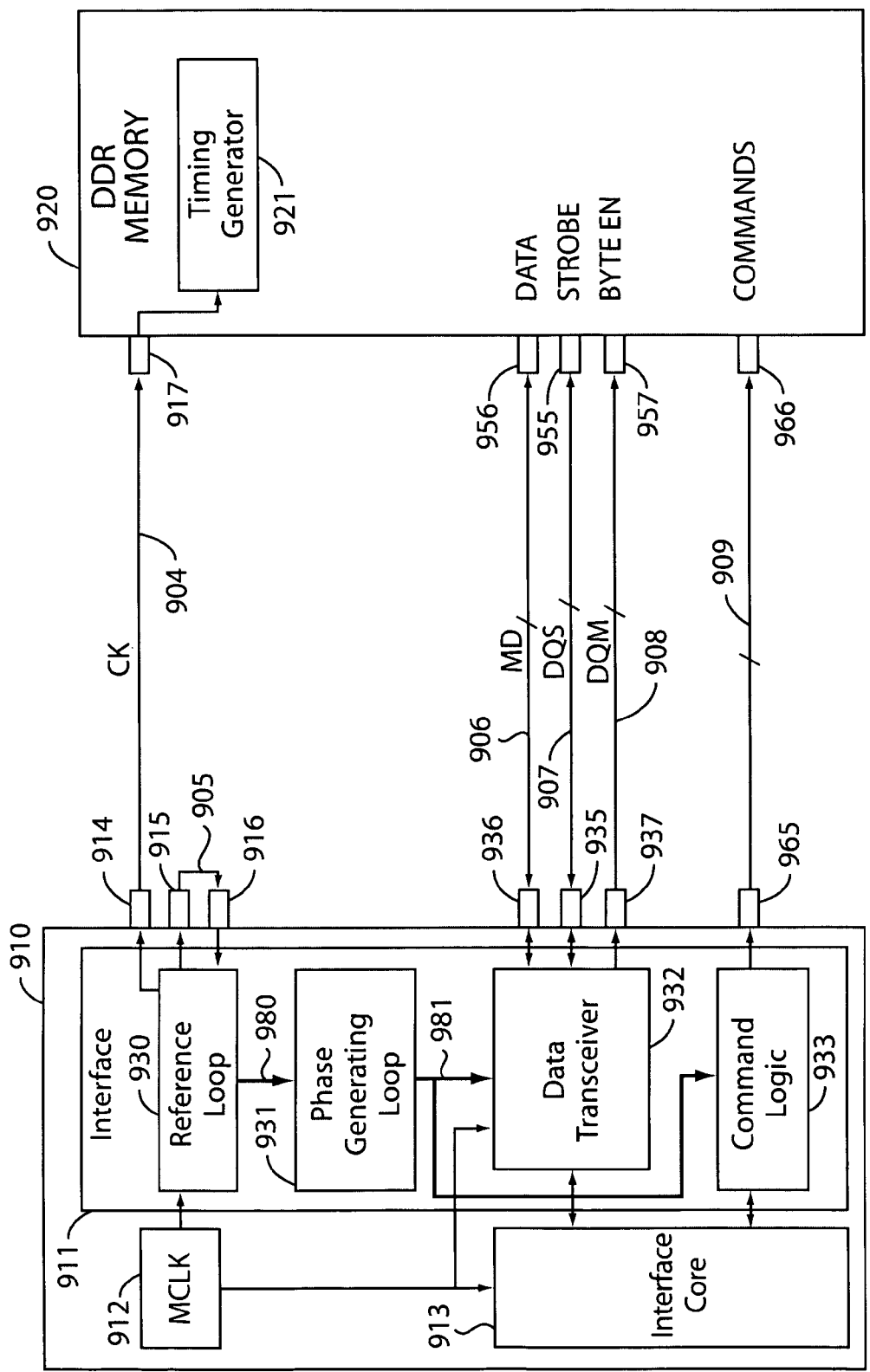
FIG. 9 illustrates an interface circuit configured to communicate with an DDR SDRAM according to one embodiment of the present invention.

As mentioned above, embodiments of the present invention include interface circuits that may also be used to communicate with an SDRAM that operates in double data rate ("DDR") mode. FIG. 9 illustrates an interface circuit configured to communicate with an DDR SDRAM according to one embodiment of the present invention. Bi-directional data signals and data strobe signals are coupled between DDR SDRAM 920 and memory interface 910 to carry out data transactions. Interface 910 includes a master clock MCLK 912 coupled to interface circuits 911 and interface core 913. The interface circuits include reference loop 930, phase generating loop 931, one or more data transceivers 932, and command logic 933. Synchronization between the interface and external memory is achieved by coupling a clock signal CK from a first reference loop output pin 914 to timing generator 921 in DDR SDRAM 920 using line 904. Transactions between DDR SDRAM 920 and interface 910 may be carried out over the following exemplary signal lines: data MD 906, data strobe DQS 907, byte enable DQM 908, and command lines 909.

Data read and write operations carried out between DDR SDRAM 920 and interface 910 must be timed in accordance with the data and data strobe signals transmitted between the systems. Clock signal MCLK 912 may be provided to reference loop 930 for generating signals for controlling the flow of data between the systems. In a DDR application, the reference loop may have a second loop output pin 915 and loop input pin 916 connected together by trace 905 to minimize the trace delay td2 (See FIG. 5). A reference loop output clock is generated by reference loop 930 and provided to timing generator 921 in DDR SDRAM 920 at input pin 917. Additionally, a reference clock signal 980 is generated by reference loop 930 and provided at an input of phase generating loop 931. The phase generating loop 931 generates phase shifted versions of the reference clock signal 980, which are coupled to data transceiver 932 and command logic 933 on signal lines 981. In one embodiment, phase generating loop 931 also generates a control voltage for controlling the phase generating loop outputs. For example, the control voltage may be the output of a low pass filter in phase generating loop 931. The control voltage may also be included in signal lines 981 that are passed to data transceiver 932.

Figure 10A:
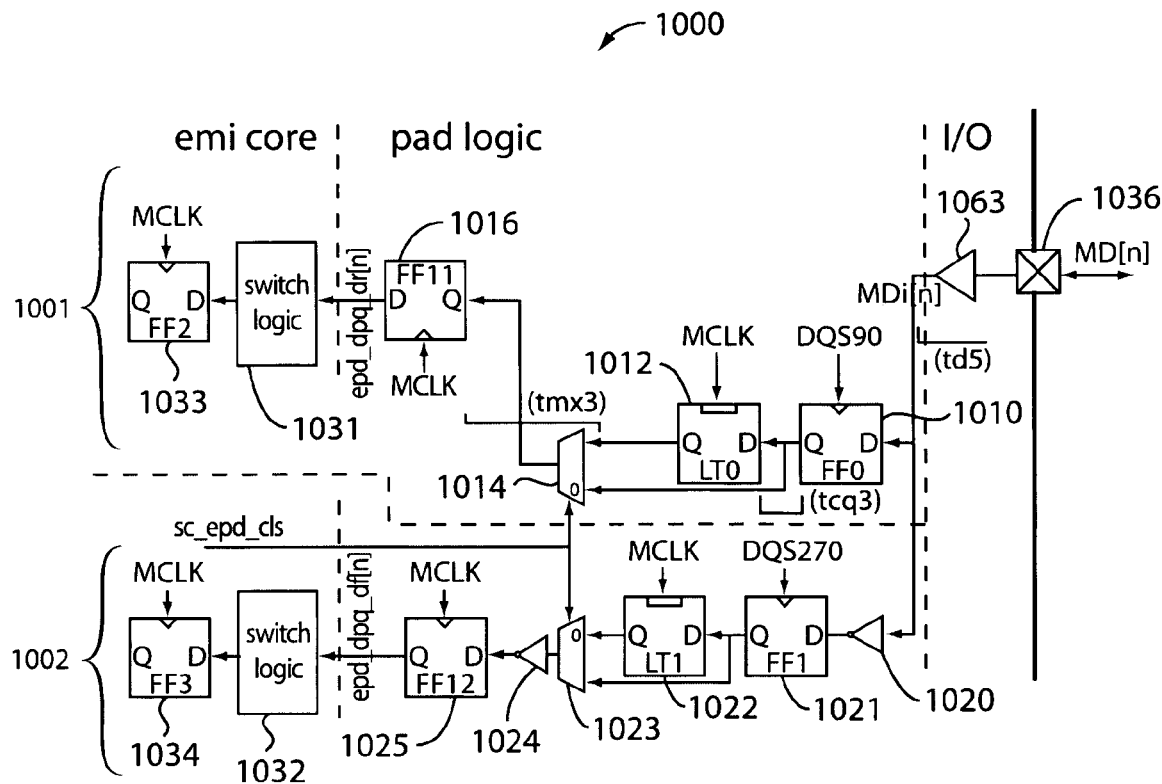
FIG. 10A illustrates an DDR input circuit that may be included in a data transceiver according to one embodiment of the present invention.

FIG. 10A illustrates an example of a DDR input circuit 1000 that may be included in a data transceiver according to one embodiment of the present invention. DDR input circuit 1000 includes input buffer 1063 having an input coupled to an MD signal line (i.e., a data line). The output of buffer 1063 is coupled to first and second data paths 1001 and 1002, respectively. The first data path includes flip-flop 1010 ("FF0"), latch 1012 ("LT0"), MUX 1014, and flip-flop 1016 ("FF11"). The second data path includes an input buffer inverter 1020, flip-flop 1021 ("FF1"), latch 1022 ("LT1"), MUX 1023, buffer inverter 1024, and flip-flop 1025 ("FF12"). The outputs of data paths 1001 and 1002 are coupled through switch logic 1031 and 1032 to flip-flops 1033 ("FF2") and 1034 ("FF3"), respectively. Control signals MCLK, DQS90, and DQS270 are used to control the flow of data in the circuit. The DQS signals are generated and received from a strobe receiver circuit described in more detail below. LT0, LT1, and MUX control signal "sc_epd_cls" are included for programming CAS latency. For example, CAS latency may be CL={1.5, 2.0, 2.5, 3.0, 3.5, or 4}, where "sc_epd_cls=0" for integer values of CL, and "sc_epd_cls=1" for non-integer values of CL.

Figure 10B:
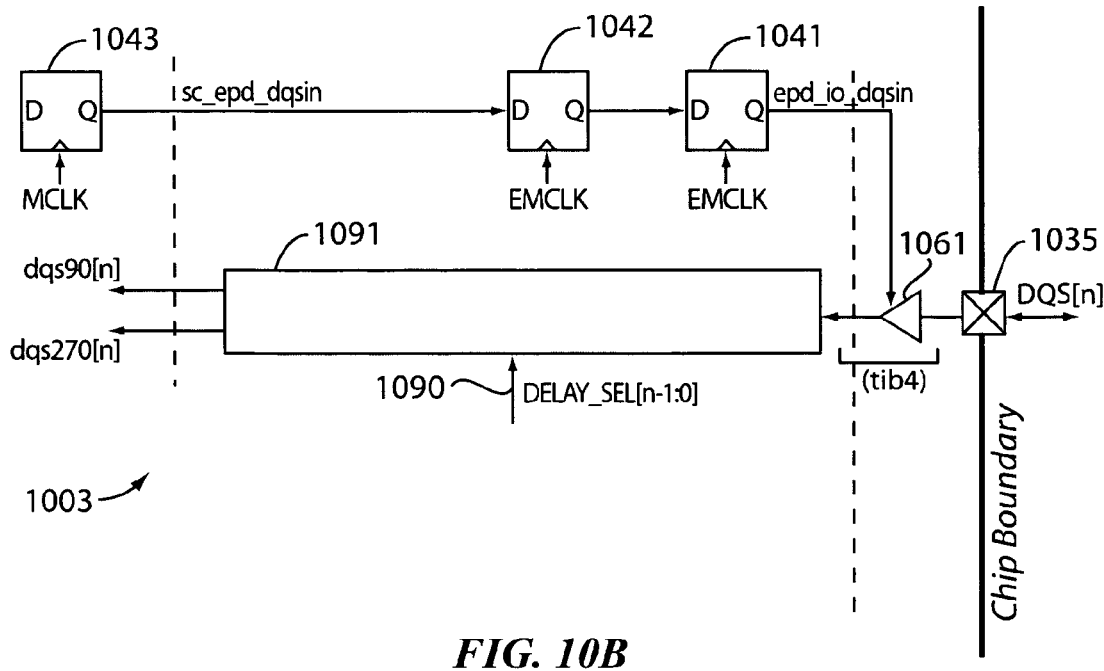
FIG. 10B illustrates a strobe receiver circuit according to one embodiment of the present invention.

FIG. 10B illustrates an example of a strobe receiver circuit 1003 according to one embodiment of the present invention. Strobe receiver circuit 1003 includes input buffer 1061 having an input coupled to an DQS[n] signal line (i.e., a data strobe line). The output of buffer 1061 is coupled to phase generator 1091. Phase generator 1091 receives a control signal input for generating phase shifted versions of the data strobe signal. In one embodiment, the control signal may be the same control signal used to control the phase generating loop outputs. Therefore, characteristics of phase generator 1091 will track the loop dynamics of the phase generating loop. In one exemplary embodiment, the phase generator 1091 is a delay element, and the control signal may be the same control signal used to control a delay element in a phase generating DLL. Accordingly, the delay of delay element 1091 will track the delay of the phase generating DLL. Therefore, the delayed data strobe signals DQS90 and DQS270 will track delayed EMCLK signals EMCLK180 and EMCLK270 (i.e., the 90 degree taps of the delay lines in the phase generating DLL and in delay line 1091 will be substantially matched). Accordingly, DQS signals related to the data strobe by 90 degrees ("DQS90") and 270 degrees ("DQS270") may be generated. Strobe receiver circuit 1003 also includes circuits for enabling input buffer 1061. For example, series connected flip-flops 1041–1043, controlled by MCLK and EMCLK, may be included for receiving an enable signal from the interface core.

Figure 10C:
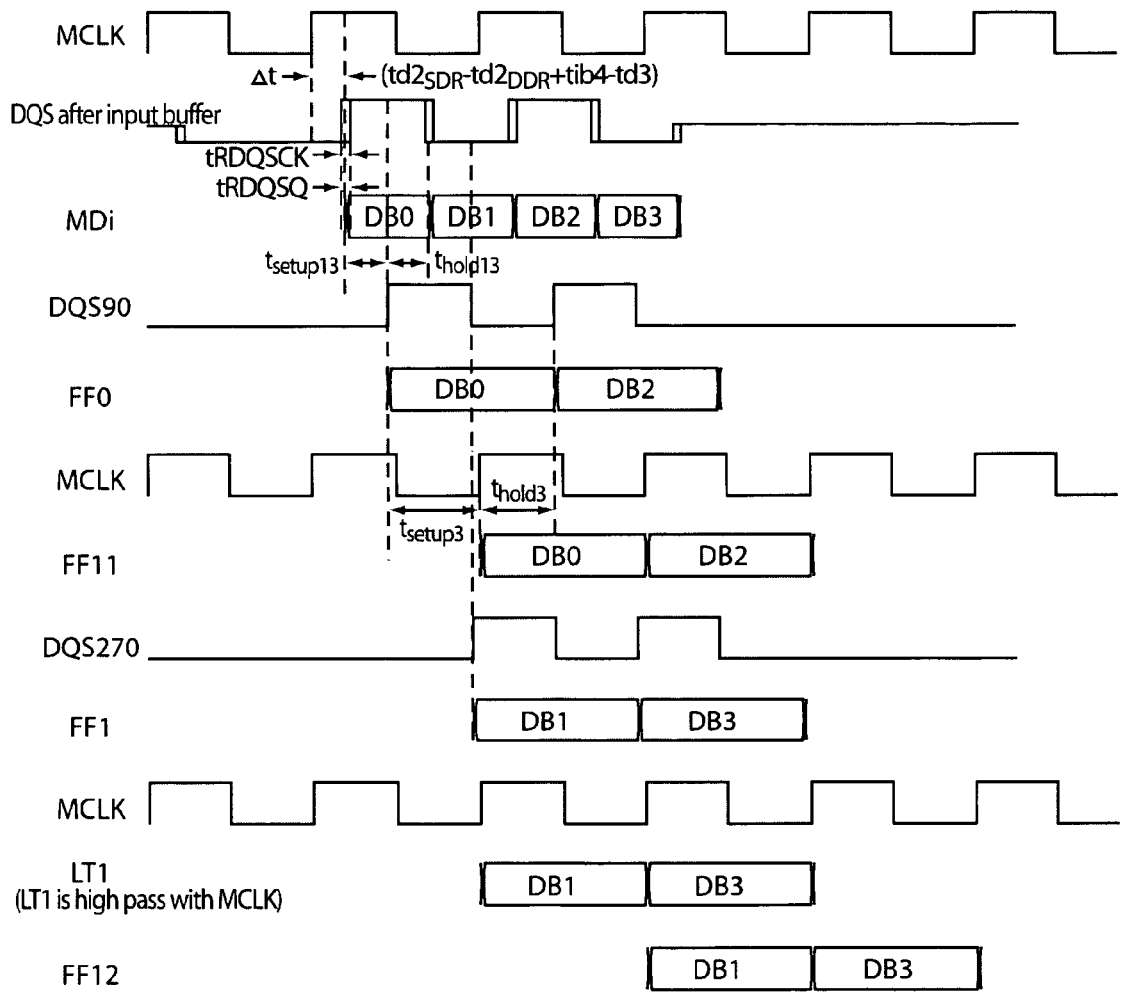
FIG. 10C illustrates a timing diagram for the circuits of FIGS. 10A and 10B for a data read operation with a CAS latency ("CL") of 2 and burst length of 4.

Operation of the output circuit 1000 can be more readily understood by referring to FIG. 10C, which illustrates a timing diagram for the circuits of FIGS. 10A and 10B for a data read operation with a CAS latency ("CL") of 2.0 and burst length of 4. Data from DDR SDRAM is received synchronously on the rising and falling edges of data strobe DQS. The time difference between DQS at the output of buffer 1061 and MCLK is $\Delta t=(tib4-td3)+(td2_{SDR}-td2_{DDR})$, where (tib4−td3) is the time delay difference between buffer 1061 and reference buffer 517 (FIG. 5), and ($td2_{SDR}-td2_{DDR}$) is the trace delay between interface 910 and DDR SDRAM 920. Exemplary delays may include tib4, td5, and td3 in the range of 0.225–0.9 ns, and the maximum difference between td5 and tib4, as well as td3 and tib4, may be 100 ps. Additionally, td2 in SDR mode, which is the round trip delay of signal line 505 (i.e., lines 650 and 651 in FIG. 6), may be between 0.375 to 1.5 ns, and td2 in DDR mode may be less than 0.2 ns.

Data at the output of buffer 1063 is received at the inputs to FF0 and, after a delay in buffer 1020, in FF1. FF0 is clocked by DQS90. Accordingly, the first data bit received (i.e., DB0) will be latched in the center of the data window because the rising edge of DQS90 is shifted 90 degrees from the rising edge of DQS. FF1 is clocked by DQS270. Accordingly, the second data bit received (i.e., DB1) will be latched in the center of the data window because the rising edge of DQS270 is shifted 270 degrees from the rising edge of DQS. Therefore, sequentially received data is alternately received on the first and second data paths 1001 and 1002. For a CL of 2.0, "sc_epd_cls=0," and the data in FF0 is loaded into FF11 through MUX 1014 under control of MCLK. However, the data in FF1 is first loaded into LT1 on the next immediate rising edge of MCLK. Data is then transferred to FF12 through MUX 1023 and buffer 1024 on the next rising edge of MCLK. Accordingly, LT1 is a transparent latch, also known as a "high pass," which passes data when MCLK is high. The data from FF11 and FF12 is then transferred to the EMI core using MCLK.

Figure 10D:
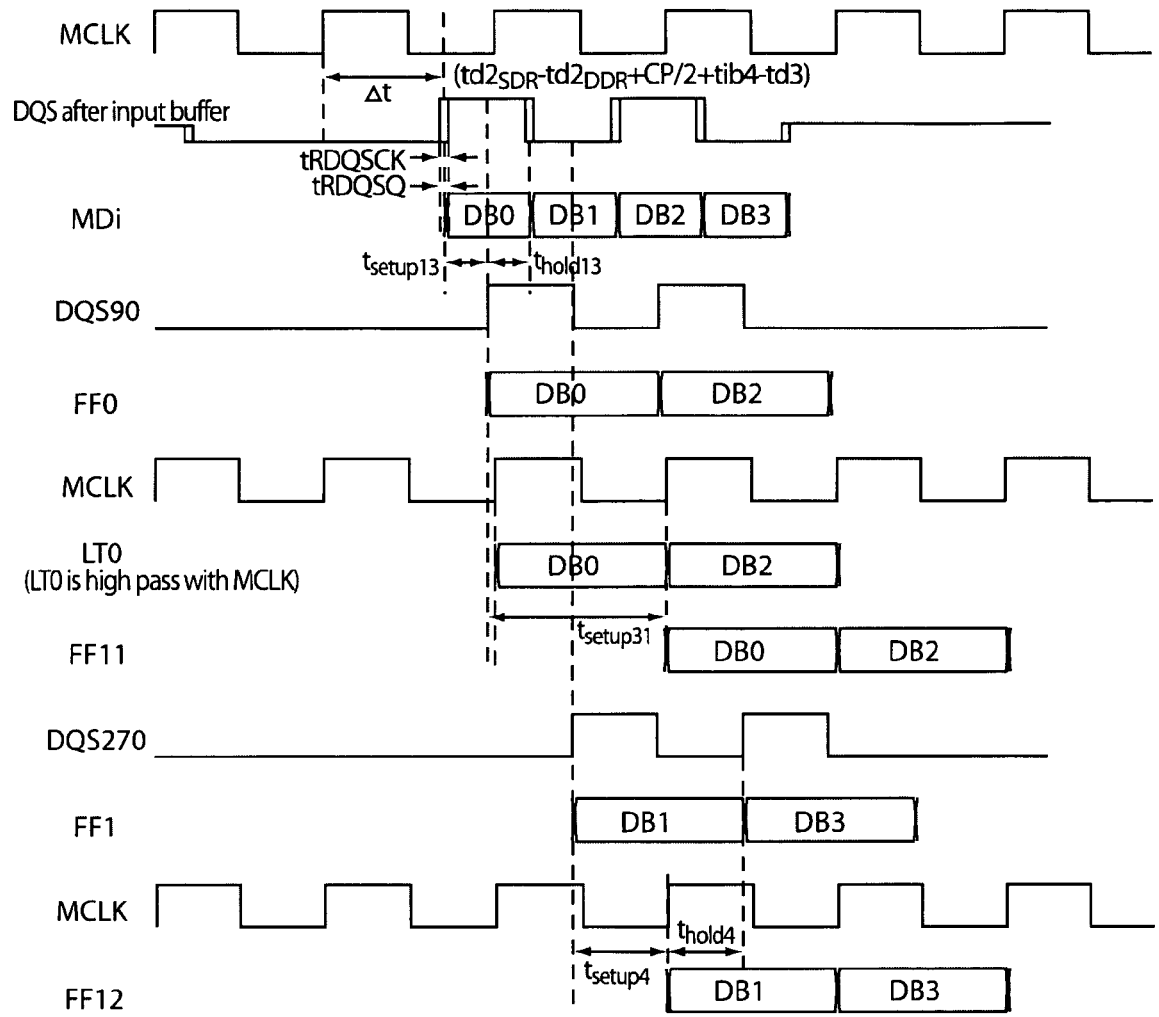
FIG. 10D illustrates a timing diagram for the circuits of FIGS. 10A and 10B for a data read operation with a CAS latency ("CL") of 2.5 and burst length of 4.

FIG. 10D illustrates a timing diagram for the circuits of FIGS. 10A and 10B for a data read operation with a CAS latency ("CL") of 2.5 and burst length of 4. Data from DDR SDRAM is again received synchronously on the rising and falling edges of data strobe DQS, but DQS is now shifted by an extra half clock period. The time difference between DQS at the output of buffer 1061 and MCLK is now $\Delta t=(tib4-td3)+(td2_{SDR}-td2_{DDR})+(CP/2)$, where CP is the clock period (e.g., 7.5–15 ns). Data at the output of buffer 1063 is clocked into FF0 and FF1 under control of DQS90 and DQS270, respectively. For a CL of 2.5, "sc_epd_cls=1," and the data in FF0 is first loaded into LT0 on the next immediate rising edge of MCLK. Data is then transferred to FF11 through MUX 1014 on the next rising edge of MCLK. Accordingly, LT0 is a high pass with MCLK. Additionally, the data in FF1 is loaded into FF12 through MUX 1023 and buffer inverter 1024 under control of MCLK. The data in FF11 and FF12 is then transferred to the EMI core using MCLK.

Figure 11A:
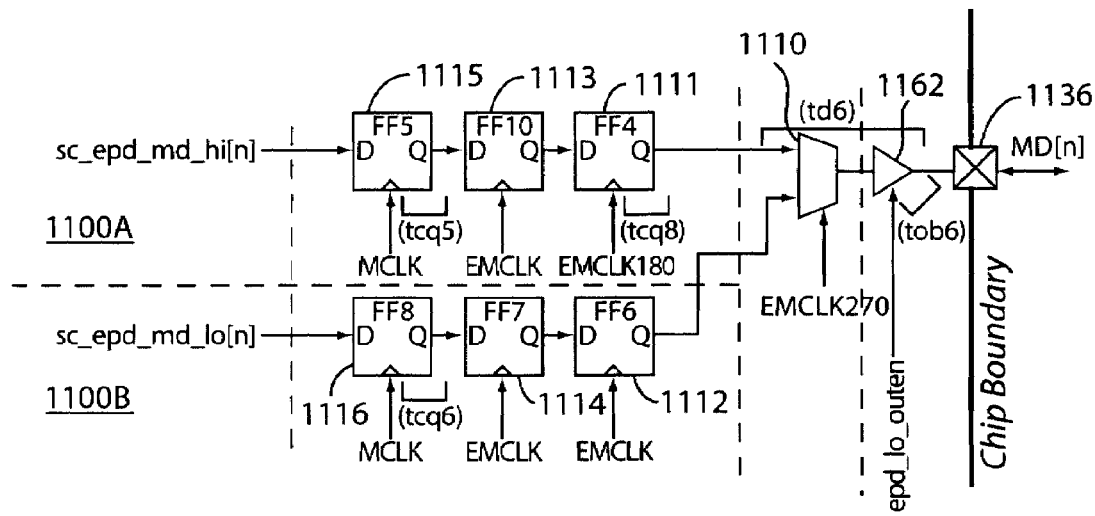
FIG. 11A illustrates an example of a DDR data output circuit that may be included in a data transceiver according to one embodiment of the present invention.

FIG. 11A illustrates an example of a DDR data output circuit 1100 that may be included in a data transceiver according to one embodiment of the present invention. Data output circuit 1100 includes a first output path 1100A and a second output path 1100B that are alternately coupled through MUX 1110 to output buffer 1162 and then to output pin 1136. Output path 1100A includes series connected flip-flops 1115 ("FF5"), 1113 ("FF10"), and 1111 ("FF4"). Output path 1100B includes series connected flip-flops 1116 ("FF8"), 1114 ("FF7"), and 1112 ("FF6").

Figure 11B:
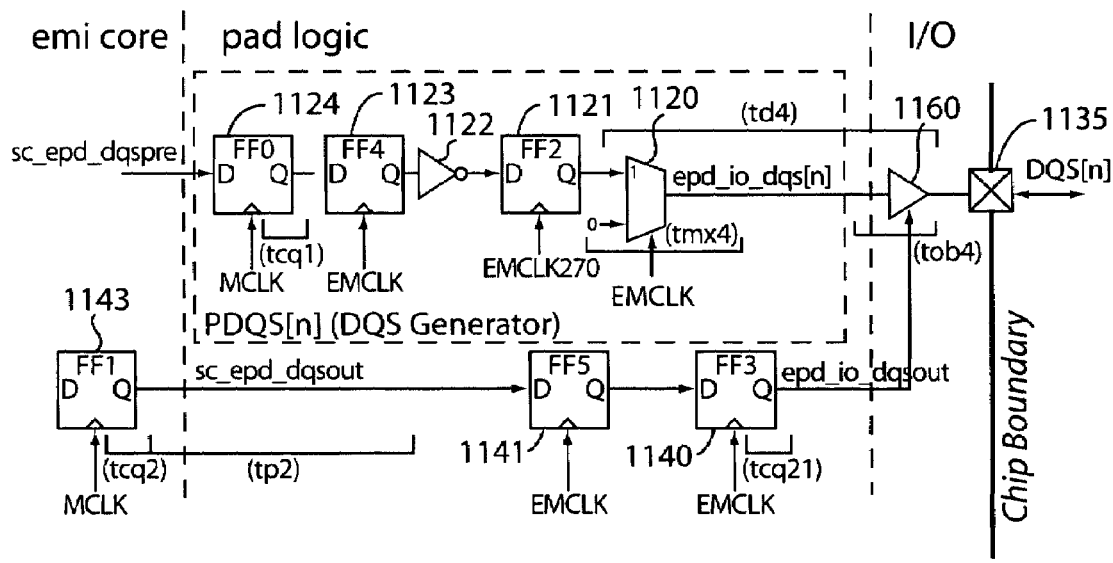
FIG. 11B illustrates an example of a strobe generator circuit according to one embodiment of the present invention.

FIG. 11B illustrates an example of a strobe generator circuit 1101 according to one embodiment of the present invention. Strobe generator circuit 1101 receives an input signal "sc_epd_dqspre" at the input to series connected flip-flops 1124 ("FF0") and 1123 ("FF4"). The output of FF4 is coupled through inverter 1122 to flip-flop 1121 ("FF2"). The output of FF2 is coupled through output MUX 1120 and output buffer 1160 to DQS pin 1135. Output buffer 1160 is enabled by series connected flip-flops 1143 ("FF1"), 1141 ("FF5"), and 1121 ("FF3")

Figure 11C:
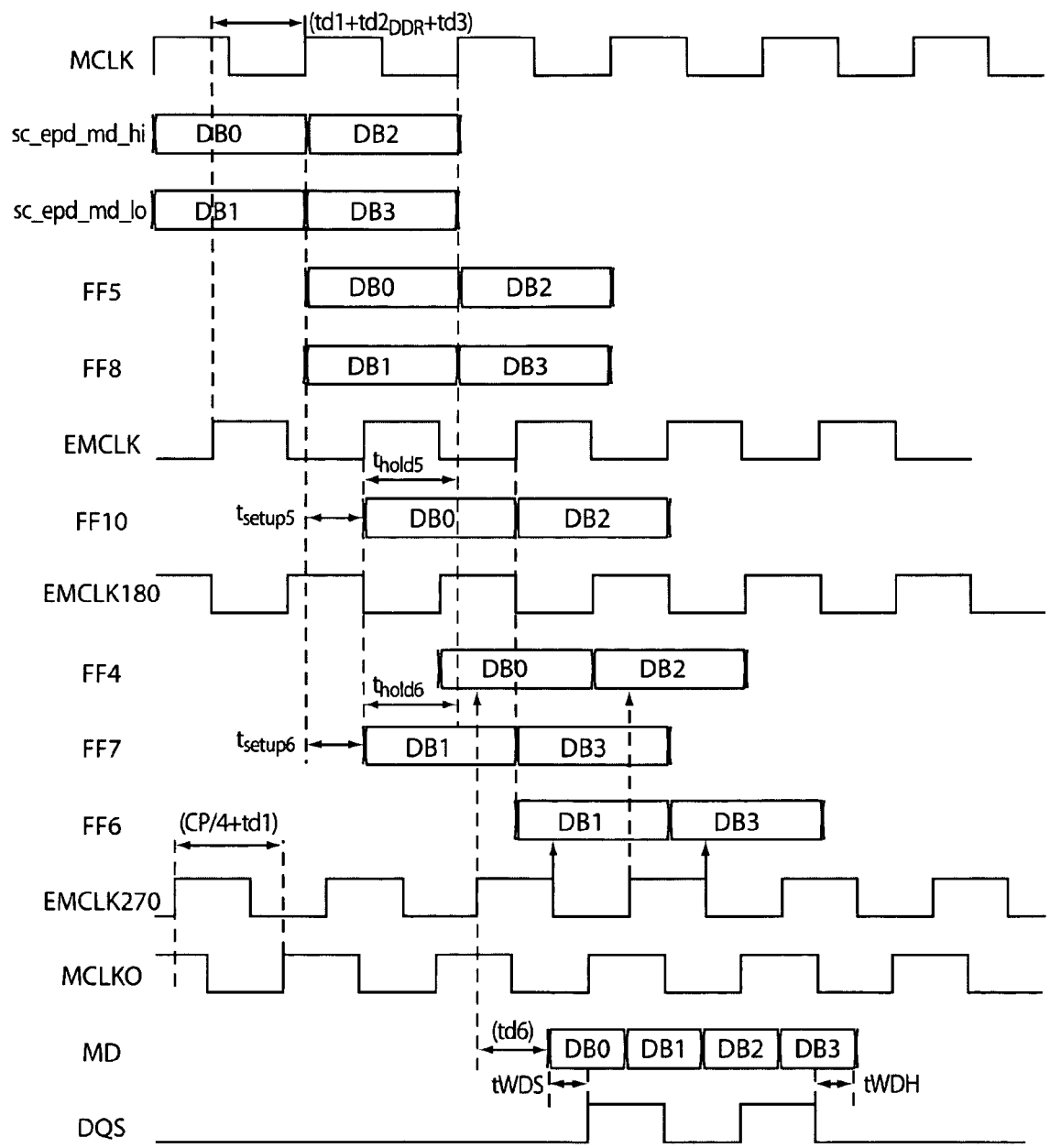
FIG. 11C illustrates a timing diagram for the circuit of FIG. 11A.
Figure 11D:
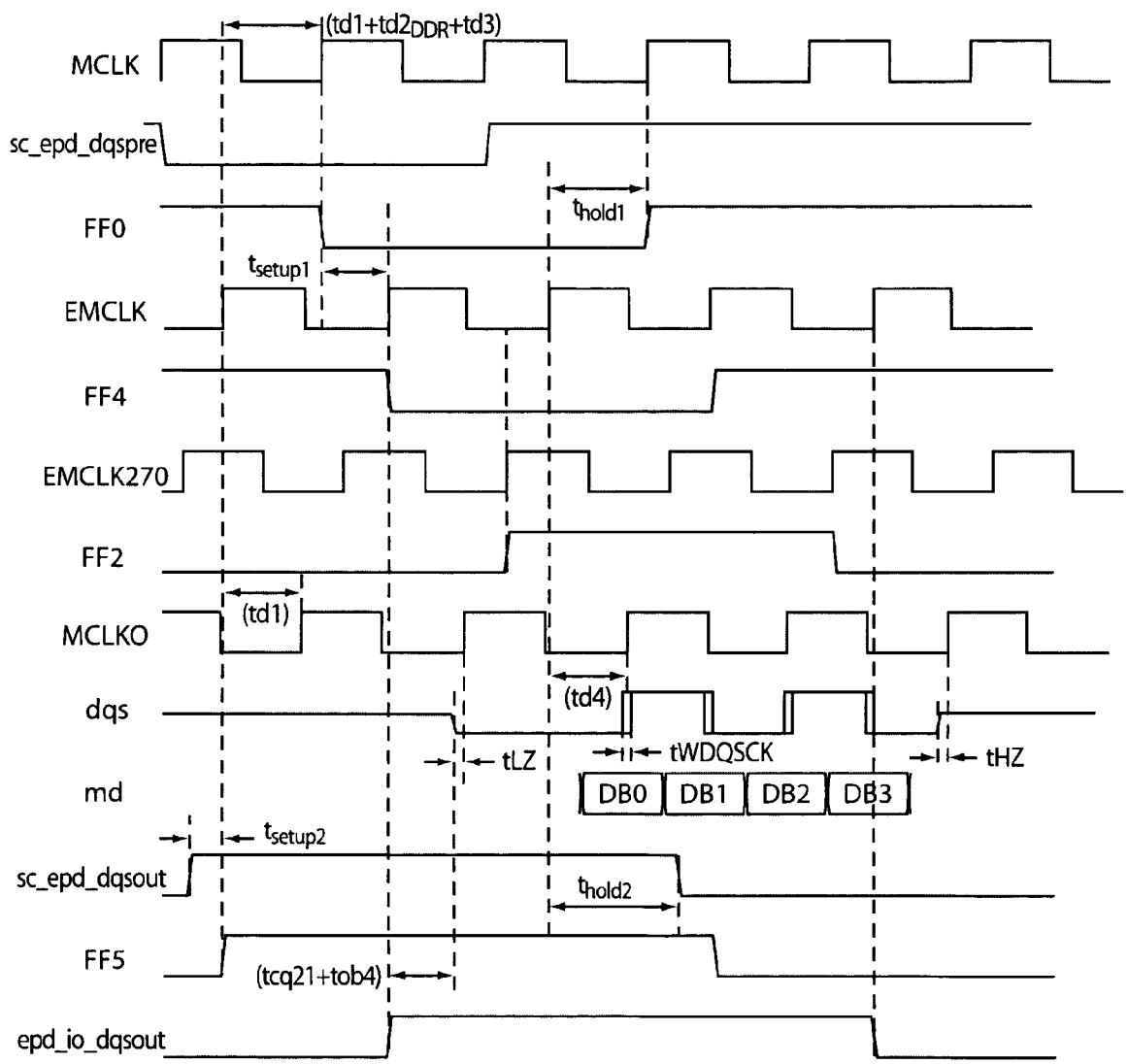
FIG. 11D illustrates a timing diagram for the circuit of FIG. 11B.

Operation of the output circuit 1100 can be more readily understood by referring to FIGS. 11C and 11D, which illustrate a timing diagrams for the circuits of FIG. 11A and FIG. 11B for a data write operation. Embodiments of the present invention provide for the synchronous transmission of data and data strobe signals from an interface to an external memory using data output circuit 1100 together with strobe generator circuit 1101. Referring to FIG. 11C successive data bits are received synchronously with MCLK in output circuit 1100 on alternate signal lines "sc_epd_m-d_hi[n]" and "sc_epd_md_lo[n]."For example, as shown in FIG. 11C, DB0 is received on "sc_epd_md_hi[n]" and DB1 is received on "sc_epd_md_lo[n]." Successive data bits are loaded from an interface core into FF5 and FF8 under control of MCLK. Next, the data is loaded into FF10 and FF7 under control of EMCLK from the outputs of FF5 and FF8, respectively. The data from FF10 is loaded into FF4 1111 under control of EMCLK180, and the data from FF7 is loaded into FF6 under control of EMCLK. Thus, the data in FF4 1111 is available one-half a clock period before the data at FF6. Data may now be alternately coupled to output pin 1136 through MUX 1110 and output buffer 1162 under the control of EMCLK270, which is connected to the control line of MUX 1110.

FIG. 11D shows a timing diagram for the circuit of FIG. 11B to further illustrate the advantages achieved by utilizing timing signals from the reference loop and phase generating loop to control a DDR data transmission. The DQS signal is generated by a control signal "sc_epd_dqspre" received from the interface core. For a burst length of 4, two rising edges and two falling edges are required for the DQS signal. Thus, the control signal is activated for two periods of MCLK. For the active low signal illustrated in FIG. 11D, the signal is held at logic low for two periods of MCLK.

The control signal from the core is first loaded into FF0 1124 on the next subsequent rising edge of MCLK after the control signal is activated. Next, the output of FF0 is loaded into FF4 1123 on the next immediate rising edge of EMCLK. As shown in FIG. 11C, the data on data line MD is synchronized to EMCLK270 by the action of MUX 1110 (i.e., the data window for each data bit is substantially aligned with the rising and falling edges of EMCLK270 offset by delay td6). Therefore, to ensure proper latching of the data, the rising and falling edges of the DQS signals are synchronized to the edges of EMCLK and offset by a similar delay td4, which will place the rising and falling edges of the DQS signal substantially in the center of the data windows.

The timing requirements above are achieved by first activating output buffer 1160 by successively transferring "sc_epd_dpsout" through FF5 1141 and FF3 1140 to generate buffer activation signal "epd_io_dqsout." The control signal from the core is then loaded into FF2 1121 from the output of FF4 1123 under control of EMCLK270. The output of FF2 1121 is coupled to a first input of MUX 1120. A second input of MUX 1120 is coupled to a logic "0." The select input is connected to EMCLK, and the DQS signal is generated under control of EMCLK by alternatively selecting between the MUX inputs.

Synchronous data transmissions using the configurations of FIGS. 11A and 11B are achieved because the reference clock signal, which is used for generating both and external memory clock signal (e.g., MCLKO) and the local data transmission control signals (e.g., EMCLK and EMCLK270), includes delay elements corresponding to delay elements in the output paths for the data signal and the data strobe signal. In particular, the data output path includes delays from MUX 1110 and output buffer 1162 (i.e., td6), the data strobe output path includes delays from MUX 1120 and output buffer 1160 (i.e., td4), and the reference loop includes delays from MUX 513 and output buffer 514 (i.e., td1). Exemplary delays may include td4 between 0.9–3.6 ns, td6 between 1.05–4.2 ns, and td1 between 1.05–4.2 ns, with a maximum difference between td4 and td1 less than 400 ps, and a maximum difference between td6 and td4 less than 400 ps.

Figure 12A:
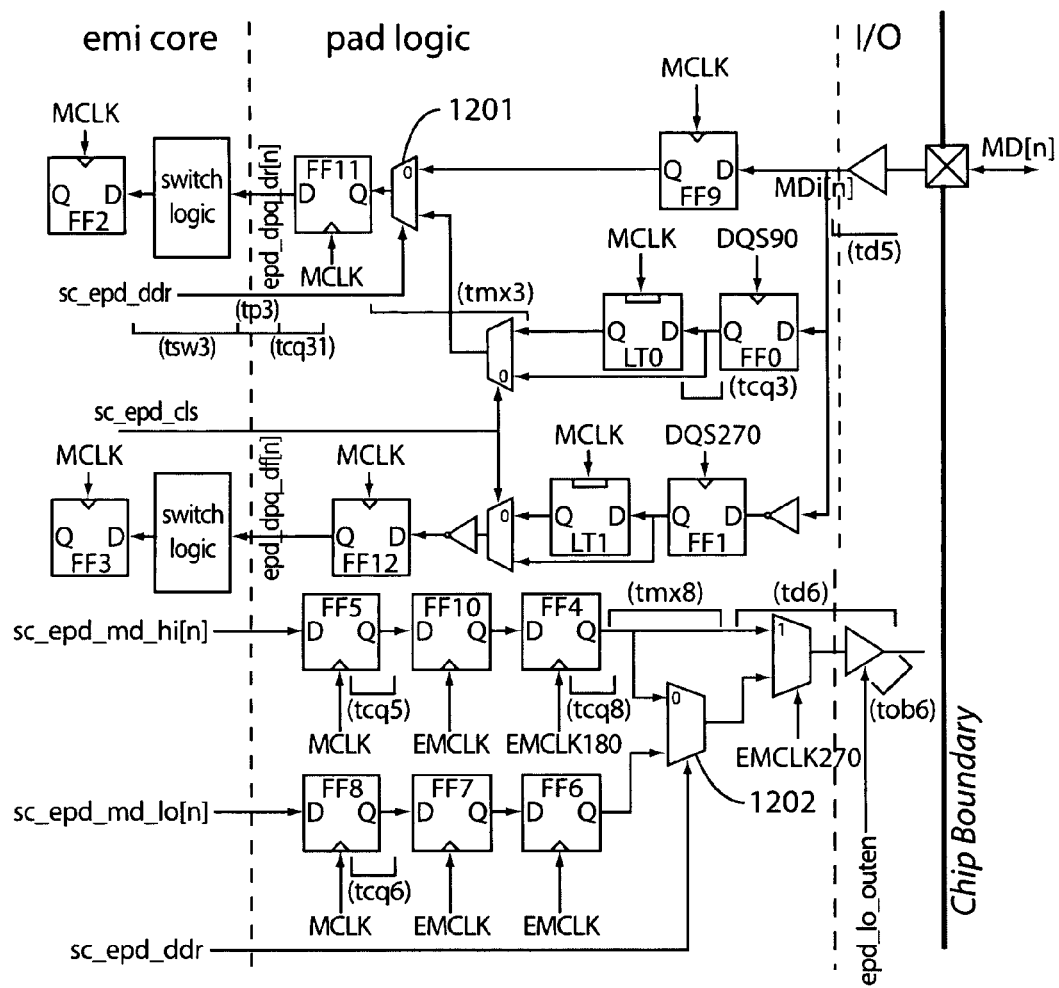
FIG. 12A illustrates a dual mode DDR and SDR data transceiver according one embodiment of the present invention.
Figure 12B:
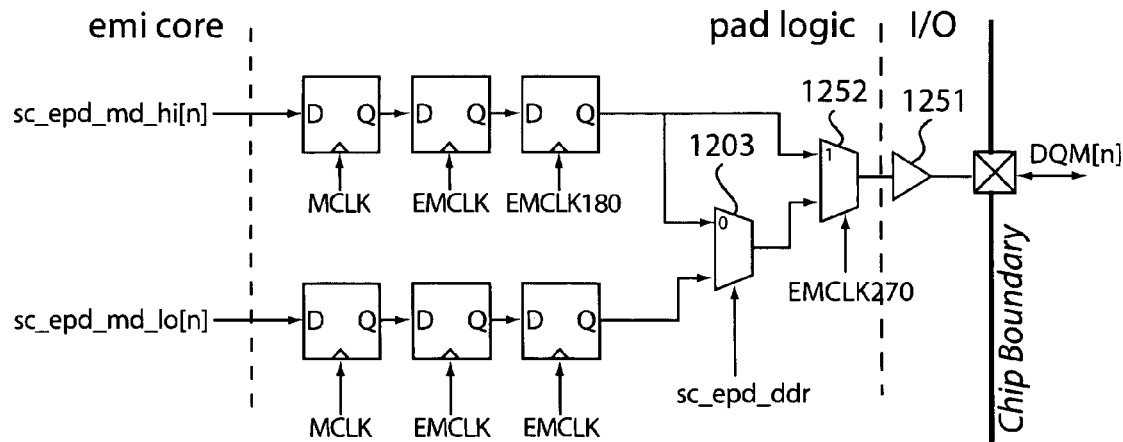
FIG. 12B illustrates a dual mode byte enable circuit including delay elements corresponding to reference loop delay elements according to one embodiment of the present invention.

Embodiments of the present invention include interface circuits that are operable in multiple data communication modes. For example, in one embodiment an interface circuit is operable in both SDR and DDR modes. FIG. 12A illustrates a dual mode DDR and SDR data transceiver according one embodiment of the present invention. Additionally, FIG. 12B illustrates a dual mode byte enable circuit (i.e., DQM generator) including delay elements 1251 and 1252 corresponding to reference loop delay elements according to one embodiment of the present invention. With regard to FIG. 12A, the SDR and DDR circuits previously described have been combined into one dual mode bi-directional circuit. MUX 1201 has been included in the input path for receiving data from the SDR path when sc_epd_ddr=0, or for receiving data from the DDR path when sc_epd_ddr=1. Similarly, MUX 1202 has been included in the output path for transmitting data from the SDR path when sc_epd_ddr=0, and for transmitting data from the DDR paths when sc_epd_ddr=1. The DQM generator of FIG. 12B also includes a MUX 1203, MUX 1252, and output buffer 1251 configured to correspond to the DDR output path so that the DQM generator is operable in both DDR and SDR modes, and further, will transmit data substantially synchronized to the other output paths.

Figure 13A:
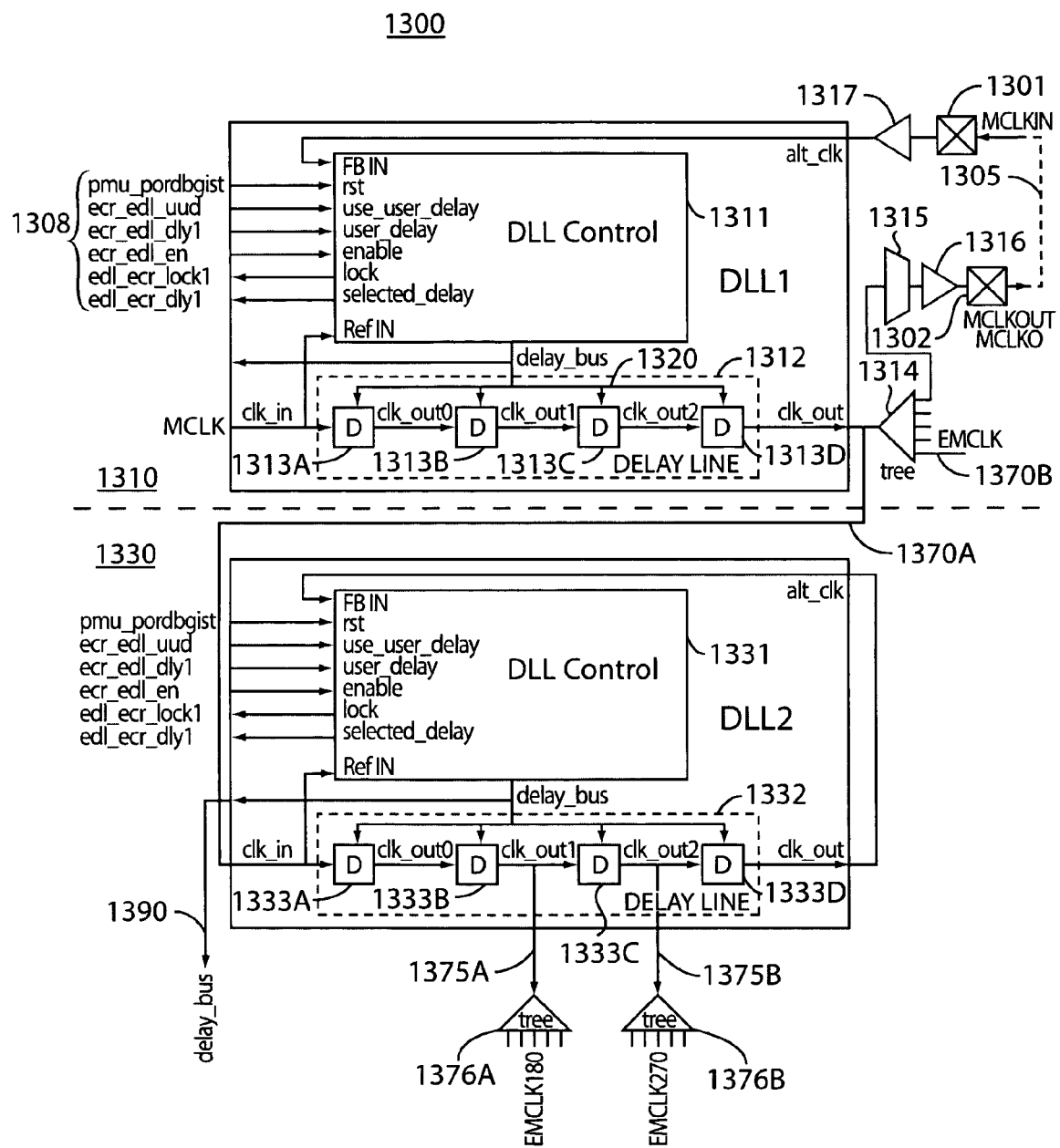
FIG. 13A illustrates one example of an interface delay locked loop system according to one embodiment of the present invention.

FIG. 13A illustrates one example of an interface delay locked loop ("DLL") system 1300 according to one embodiment of the present invention. Interface delay locked loop system 1300 includes a reference loop 1310 and a phase generating loop 1330. Reference loop 1310 includes a DLL controller 1311 and delay line 1312. Delay line 1312 includes delay elements 1313A–D, and is controlled by signals on "delay_bus" line 1320. Reference loop 1310 receives a reference clock input MCLK at the input of delay line 1312 and the reference input ("Ref In") of the DLL controller 1311. The reference clock signal line is also labeled "clk_in" in FIG. 13. The output of delay line 1312 is coupled to the feedback input ("FB In") of DLL controller 1311 through reference delay elements 1314–1317. Reference delay elements 1314–1317 are included in the loop to compensate for time delays caused by other elements in an electronic system. Reference delay elements in the loop include a clock tree 1314, MUX 1315, output buffer 1316, and input buffer 1317. The feedback loop may be closed externally by connecting output pin 1302 to input pin 1301 using external trace 1305. The feedback signal line is labeled "alt_clk" in FIG. 13. Reference loop 1310 also includes a plurality of control signals 1308 such as a reset signal ("pmu_pordbgrst"), user delay control signals ("ecr_edl_uud" and "ecr_eld_dly1[5:0]"), an enable signal ("ecr_edl—en"), a lock signals ("edl_ecr_lock1"), and current delay value signals ("edl_ecr_dly1").

Reference loop 1310 generates timing control signal that may be used by other circuits for controlling the flow of data in the system. First, reference loop 1310 generates an external clock signal MCLKO that can be used by an external system, such as an SDR or DDR memory. Reference loop 1310 also generates two versions of an early MCLK ("EMCLK") before clock tree 1314 on signal line 1370A, and after clock tree 1314 on signal line 1370B. EMCLK on line 1370B is provided to other parts of the system, but EMCLK on 1370A is used as the input to phase generating loop 1330.

Phase generating loop 1330 includes a DLL controller 1331 and delay line 1332. Delay line 1332 includes delay elements 1333A-D, and is controlled by delay control signals on "delay_bus" line 1390. Phase generating loop 1330 receives EMCLK on line 1370A at the input of delay line 1332 and the reference input ("Ref In") of the DLL controller 1331. The input clock signal line is also labeled "clk_in" in FIG. 13. The output of delay line 1332 is coupled to the feedback input ("FB In") of DLL controller 1331. The feedback signal line is labeled "alt_clk" in FIG. 13. Phase generating loop 1330 generates phase shifted versions of EMCLK in delay line 1332 and produces the phase shifted versions on lines 1375A and 1375B. Delay line 1332 includes four equal delay elements 1333A–D. When the loop is locked, each delay element will introduce a 90 degree phase shift to the input signal. Accordingly, line 1375A carries a 180 degree phase shifted version of EMCLK ("EMCLK180") and line 1375B carries a 270 degree phase shifted version of EMCLK ("EMCLK270"). EMCLK180 and EMCLK270 are provided to other system resources through clock trees 1376A and 1376B, respectively. The clock trees ensure that EMCLK, EMCLK180, and EMCLK270 are substantially synchronized. Additionally, the delay control signals on "delay_bus" are provided to other system resources on line 1390. Phase generating loop 1330 also includes a plurality of control signals 1309 such as a reset signal ("pmu_pordbgrst"), user delay control signals ("ecr_edl_uud" and "ecr_eld_dly2[5:0]"), an enable signal ("ecr_dly2"), a lock signal ("edl_ecr_lock2"), and current delay value signals ("edl_ecr_dly2"). It is to be understood that while the present embodiment utilizes equal 90 degree delay elements in the delay line, other elements could be used in other applications. Furthermore, other phase shifted versions could be transmitted to other system resources depending on the requirements of the particular system.

Figure 13B:
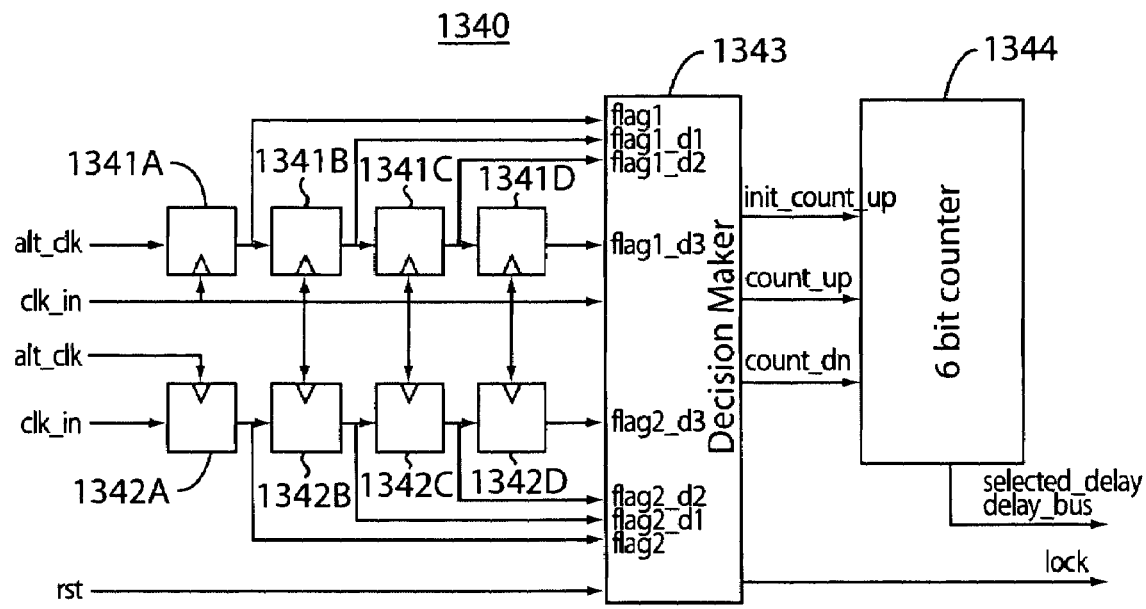
FIG. 13B illustrates one example of a delay locked loop controller according to one embodiment of the present invention.

FIG. 13B illustrates one example of a DLL controller 1340 according to one embodiment of the present invention. DLL controller 1340 includes eight flip-flops 1341A–D and 1342A–D to detect the phase difference between signals on "clk_in" and "alt_clk." The outputs of the flip-flops are provided as inputs to decision logic 1343. Decision logic 1343 has three outputs "count_up," "count_dn," and "init_count_up"coupled to the inputs of a 6-bit counter 1344. The "count_up" signal is asserted when "flag1," "flag1_d1," "flag1_d2," and "flag1_d3" are all asserted. The "count$_{13}$ dn"signal is asserted when "flag2," "flag2_d1," "flag2_d2, " and "flag2_d3 " are all asserted. If a reset signal is received on "rst," then "init_count_up" is asserted, and it is deasserted only if the "count_up" is ever asserted. 6-bit counter 1344 is reset to zero when "init_count_up" is asserted. Counter 1344 counts up when "count_up" is asserted, and counts down if "count_dn" is asserted. The output of counter 1344 is "delay_bus[5:0], which is a 6-bit signal for controlling the delay lines. Those skilled in the art will recognize that the action of decision logic 1343 and counter 1344 operate to digitally low pass filter the flip-flop outputs to produce the "delay_bus" control signal.

Figure 13C:
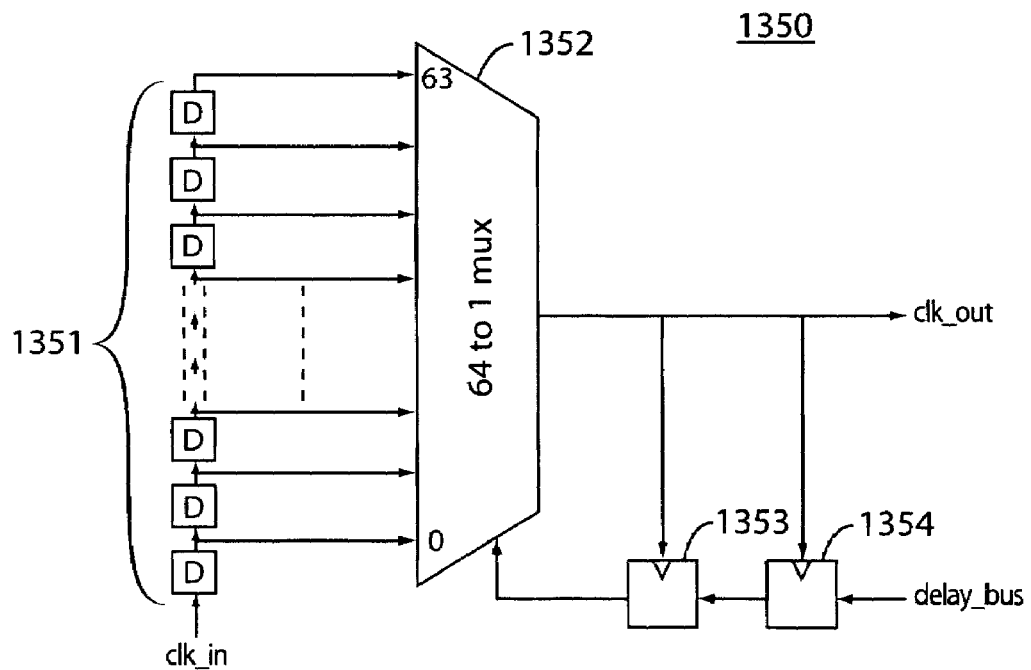
FIG. 13C illustrates one example of a delay element according to one embodiment of the present invention.

FIG. 13C illustrates one example of a delay element 1350 that may be used in a delay line according to one embodiment of the present invention. Delay element 1350 includes 64 series connected delay cells 1351 and a 64-to-1 MUX 1352. Each delay cell has an output coupled to one input of MUX 1352. A clock signal "clk_in" is provided to the series connected delay cells to generate 64 delayed versions of the clock at the corresponding 64 inputs of MUX 1352. The "delay_bus" signal from a DLL controller is coupled to the MUX select input through flip_flops 1353 and 1354 to select one of the 64 delayed clocks. Accordingly, when the counter in a DLL controller counts up the MUX selects an output clock with a greater delay, and when the counter in a DLL controller counts down the MUX selects an output clock with a smaller delay.

Having fully described alternative embodiments of the present invention, other equivalent or alternative techniques according to the present invention will be apparent to those skilled in the art. For example, it will be evident to those skilled in the art that the techniques discussed above may applied advantageously to interfacing a variety of circuits and systems. Additionally, while some embodiments may use single ended signal lines, other embodiments may use differential signal lines. Moreover, other embodiments directed to interfacing with external memories may include variations on the particular signal lines described. Accordingly, embodiments of the present invention may be advantageously applied to a variety of external memory architectures other than the architectures described above. These equivalents and alternatives along with the understood obvious changes and modifications are intended to be included within the scope of the present invention as defined by the following claims.

What is claimed is:

1. An interface circuit, comprising:
    a clock signal line providing a first clock;
    a first phase locked loop coupled to said clock signal line, said first phase locked loop adapted to generate a second clock;
    a second phase locked loop adapted to receive said second clock, said second phase locked loop adapted to generate a phase shifted third clock; and
    a data transceiver adapted to receive said second clock or said third clock signal, said data transceiver adapted to control a data transfer between a first circuit and a second circuit,
    wherein said first phase locked loop includes a first delay unit,
    wherein said second phase locked loop includes a second delay unit, and
    wherein said first delay unit and said second delay unit have an approximately equal delay time.

2. The interface circuit according to claim 1,
    wherein said first circuit includes a central processing unit, and
    wherein said second circuit includes a DDR SDRAM.

3. The interface circuit according to claim 1,
    wherein said first delay unit is a first input buffer, and said second delay unit is a second input buffer.

4. The interface circuit according to claim 1,
    wherein said first delay unit is a first output buffer, and said second delay unit is a second output buffer.

5. The interface circuit according to claim 1, further comprising:
    a clock output terminal coupled to said first output buffer, said clock output terminal adapted to provide an operating clock signal to said second circuit; and
    a data output terminal coupled to said second output buffer, said data output terminal adapted to provide a data to said second circuit.

6. The interface circuit according to claim 1,
    wherein said first circuit is a central processing unit, and wherein said second circuit is a DDR SDRAM.

7. The interface circuit according to claim 1,
    wherein said first phase locked loop includes a feedback loop having said first delay unit.

8. A data processor, comprising:
    a central processing unit; and
    a memory interface circuit adapted to couple to an external memory;
    wherein said memory interface circuit includes:
        a first phase locked loop coupled to a clock line to provide a first clock signal for said memory interface circuit, said first phase locked loop adapted to generate a second clock signal;
        a second phase locked loop adapted to receive said second clock signal, said second phase locked loop adapted to generate a third clock signal; and
        a data transceiver adapted to receive one of said second clock signal and said third clock signal, said data transceiver adapted to control a flow of data between said central processing unit and said external memory,
    wherein said first phase locked loop includes a feed back loop, and said feed back loop includes a first delay unit,
    wherein said second phase locked loop includes a second delay unit, and
    wherein a first time delay of said first phase locked loop and a second time delay of said second phase locked loop are approximately equal.

9. The data processor according to claim 8,
    wherein said memory interface circuit is adapted to couple to a DDR SDRAM.

10. The data processor according to claim 8,
    wherein said first delay unit is a first input buffer, and wherein said second delay unit is a second input buffer.

* * * * *